US012236965B2

(12) United States Patent
Rafii et al.

(10) Patent No.: US 12,236,965 B2
(45) Date of Patent: *Feb. 25, 2025

(54) METHODS, APPARATUS, AND ARTICLES OF MANUFACTURE TO IDENTIFY SOURCES OF NETWORK STREAMING SERVICES

(71) Applicant: Gracenote, Inc., Emeryville, CA (US)

(72) Inventors: Zafar Rafii, Berkeley, CA (US); Markus Cremer, Orinda, CA (US); Bongjun Kim, Evanston, IL (US)

(73) Assignee: Gracenote, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,771

(22) Filed: Feb. 14, 2024

(65) Prior Publication Data

US 2024/0185868 A1 Jun. 6, 2024

Related U.S. Application Data

(63) Continuation of application No. 17/360,605, filed on Jun. 28, 2021, now Pat. No. 11,948,589, which is a (Continued)

(51) Int. Cl.

*G10L 19/018* (2013.01)
*G10L 19/02* (2013.01)

(Continued)

(52) U.S. Cl.

CPC .......... *G10L 19/0212* (2013.01); *G10L 25/51* (2013.01); *G10L 19/02* (2013.01); *G10L 25/03* (2013.01); *H04H 60/58* (2013.01)

(58) Field of Classification Search

CPC ........ G10L 19/02; G10L 19/018; G10L 25/51
See application file for complete search history.

(56) References Cited

U.S. PATENT DOCUMENTS

| | | | |
|---|---|---|---|
| 5,373,460 | A | 12/1994 | Marks, II |
| 6,820,141 | B2 | 11/2004 | Bennett |

(Continued)

FOREIGN PATENT DOCUMENTS

| | | |
|---|---|---|
| GB | 2474508 | 4/2011 |
| KR | 20140023389 | 2/2014 |

(Continued)

OTHER PUBLICATIONS

Jenner, Frank. "Non-intrusive identification of speech codecs in digital audio signals." (2011). (Year: 2011).*

(Continued)

*Primary Examiner* — Jialong He

(74) *Attorney, Agent, or Firm* — McDonnell Boehnen Hulbert & Berghoff LLP

(57) ABSTRACT

Methods, apparatus and articles of manufacture to identify sources of network streaming services are disclosed. An example method includes receiving a first audio signal that represents a decompressed second audio signal, identifying, from the first audio signal, a parameter of an audio compression configuration used to form the decompressed second audio signal, and identifying a source of the decompressed second audio signal based on the identified audio compression configuration.

20 Claims, 12 Drawing Sheets

Related U.S. Application Data continuation of application No. 16/238,189, filed on Jan. 2, 2019, now Pat. No. 11,049,507, which is a continuation-in-part of application No. 15/793,543, filed on Oct. 25, 2017, now Pat. No. 10,733,998.

(51) Int. Cl.

| | |
|---|---|
| ***G10L 25/51*** | (2013.01) |
| ***H04H 60/58*** | (2008.01) |
| *G10L 25/03* | (2013.01) |

(56) References Cited

U.S. PATENT DOCUMENTS

| | | | | |
|---|---|---|---|---|
| 7,742,737 | B2 | 6/2010 | Peiffer et al. | |
| 7,907,211 | B2 | 3/2011 | Oostveen et al. | |
| 8,351,645 | B2 | 1/2013 | Srinivasan | |
| 8,553,148 | B2 | 10/2013 | Ramaswamy et al. | |
| 8,559,568 | B1 | 10/2013 | Clark | |
| 8,639,178 | B2 | 1/2014 | Anniballi et al. | |
| 8,768,713 | B2 | 7/2014 | Chaoui et al. | |
| 8,825,188 | B2 | 9/2014 | Stone et al. | |
| 8,856,816 | B2 | 10/2014 | Falcon | |
| 9,049,496 | B2 | 6/2015 | Raesig et al. | |
| 9,313,359 | B1 | 4/2016 | Stojancic et al. | |
| 9,456,075 | B2 | 9/2016 | Ponting et al. | |
| 9,515,904 | B2 | 12/2016 | Besehanic et al. | |
| 9,641,892 | B2 | 5/2017 | Panger et al. | |
| 9,648,282 | B2 | 5/2017 | Petrovic et al. | |
| 9,837,101 | B2 | 12/2017 | Bilobrov | |
| 9,905,233 | B1 | 2/2018 | Shivappa | |
| 10,629,213 | B2 | 4/2020 | Rafii et al. | |
| 10,726,852 | B2 | 7/2020 | Rafii | |
| 10,733,998 | B2 | 8/2020 | Rafii et al. | |
| 11,049,507 | B2 | 6/2021 | Rafii et al. | |
| 2003/0026201 | A1 | 2/2003 | Amesen | |
| 2003/0086341 | A1 | 5/2003 | Wells et al. | |
| 2005/0015241 | A1 | 1/2005 | Baum | |
| 2006/0025993 | A1 | 2/2006 | Aarts et al. | |
| 2008/0169873 | A1 | 7/2008 | Toda | |
| 2013/0058522 | A1 | 3/2013 | Raesig et al. | |
| 2014/0088978 | A1 | 3/2014 | Mundt et al. | |
| 2014/0137146 | A1 | 5/2014 | Topchy et al. | |
| 2014/0336800 | A1 | 11/2014 | Radhakrishnan et al. | |
| 2014/0369508 | A1* | 12/2014 | Forrester | G06F 3/162<br>381/56 |
| 2015/0170660 | A1 | 6/2015 | Han et al. | |
| 2015/0222951 | A1 | 8/2015 | Ramaswamy | |
| 2015/0302086 | A1 | 10/2015 | Roberts et al. | |
| 2016/0196343 | A1 | 7/2016 | Rafii | |
| 2017/0048641 | A1 | 2/2017 | Franck | |
| 2017/0334234 | A1 | 11/2017 | Curtis | |
| 2017/0337926 | A1 | 11/2017 | Chon et al. | |
| 2018/0315435 | A1 | 11/2018 | Goodwin et al. | |
| 2018/0365194 | A1 | 12/2018 | Grado et al. | |
| 2019/0122673 | A1 | 4/2019 | Rafii et al. | |
| 2019/0139559 | A1 | 5/2019 | Rafii et al. | |
| 2020/0234722 | A1 | 7/2020 | Rafii et al. | |
| 2021/0027792 | A1 | 1/2021 | Rafii et al. | |

FOREIGN PATENT DOCUMENTS

| | | |
|---|---|---|
| WO | 2012177870 | 12/2012 |
| WO | 2019084065 | 5/2019 |

OTHER PUBLICATIONS

Drăghicescu, Dragoş, Gheorghe Pop, and Corneliu Burileanu. "Codec Recognition From Decoded Audio." 2014 10th International Conference on Communications (COMM). IEEE, 2014. (Year: 2014).*

Kim, Bongjun, and Zafar Rafii. "Lossy audio compression identification." 2018 26th European Signal Processing Conference (EUSIPCO). IEEE, 2018. (Year: 2018).

Zakariah, Mohammed, Muhammad Khurram Khan and Hafiz Malik, "Digital multimedia audio forensics: past, present and future." Multimedia tools and applications 77 (2018): 1009-1040. (Year 2018).

Hicsonmez, Samet, Husrev T. Sencar, and Ismail Avcibas. "Audio codec identification from coded and transcoded audios." Digital Signal Processing 23.5 (2013): 1720-1730. (Year: 2013).

Yang, Rui, Yun Q. Shi, and Jiwu Huang. "Detecting double compression of audio signal." Media Forensics and Security II. vol. 7541. SPI E, 2010. (Year: 2010).

Patent Cooperation Treaty, "International Preliminary Report on Patentability", issued in connection with International Application No. PCT/US2018/057183, dated Apr. 28, 2020, 5 pages.

Jenner et al., "Highly Accurate Non-Intrusive Speech Forensics for Codec Identifications from Observed Decoded Signals," 2012 IEEE International Conference on Acoustics, Speech and Signal Processing (ICASSP), IEEE 2012, pp. 737-1740, 4 pages.

Luo et al, "Compression History Identification for Digital Audio Signal," 2021 IEEE International Conference on caustics, Speech and Signal Processing (ICASSP), IEEE, 2012, 4 pages.

Luo et al., "Identification of AMR decompressed audio," Digital Signal Processing vol. 37, 2015: pp. 85-91 (7 pages).

Todd et al, "AC-3: Flexible Perceptual Coding for Audio Transmission and Storage", presented at the 96th Convention of the Audio Engineering Society, Feb. 26-Mar. 1, 1994, 13 pages.

Brandenburg et al, "ISO-MPEG-1 Audio: A Generic Standard for Coding of High-Quality Digital Audio", presented at the 92nd Convention of the Audio Engineering Society, 1992; revised Jul. 15, 1994, 13 pages.

Brandenburg, Karlheinz, "MP3 and AAC Explained", presented al the Audio Engineering Society's 17th International Conference on High Quality Audio Coding, Sep. 2-5, 1999, 12 pages.

Herre et al, "Analysis of Decompressed Audio—The "Inverse Decoder"", presented at the 109th Convention of the Audio Engineering Society, Sep. 22-25, 2000, 24 pages.

Moehrs et al, "Analysing decompressed audio with the "Inverse Decoder"—towards an operative algorithm", presented at the 112the Convention of the Audio Engineering Society, May 10-13, 2002, 22 pages.

Bosi et al., "Introduction to Digital Audio Coding and Standards", published by Kluwer Academic Publishers, 2003, 126 pages.

Yang et al., "Detecting Digital Audio Forgeries by Checking Frame Offsets", presented at the 10th annual ACM Multimedia & Security Conference, Sep. 22-23, 2008, 6 pages.

D'Alessandro et al., "MP3 Bit Rate Quality Detection through Frequency Spectrum Analysis", presented at the 11th annual ACM Multimedia & Security Conference, Sep. 7-8, 2009, 5 pages.

Yang et al., "Defeating Fake-Quality MP3", presented at the 11th annual ACM Multimedia & Security Conference, Sep. 7-8, 2009, 8 pages.

Liu et al., "Detection of Double MP3 Compression", published in Cognitive Computation, May 22, 2010, 6 pages.

Hicsonmez et al., "Audio Codec Identification Through Payload Sampling", published in Information Forensics and Security (WIFS), 2011, 6 pages.

Advanced Television Systems Committee, "ATSC Standard: Digital Audio Compression {AC-3, E-AC-3)", Dec. 17, 2012, 270 pages.

Hicsonmez et al., "Methods for Identifying Traces of Compression in Audio", published online, URL: https://www.esearchgate.net/publication/26199644, May 1, 2014, 7 pages.

Bianchi et al., "Detection and Classification of Double Compressed MP3 Audio Tracks", presented at the 1st Annual AMC workshop on Information Hiding & Multimedia Security, Jun. 17-19, 2013, 6 pages.

Qiao et al., "Improved Detection of MP3 Double Compression using Content-Independent Features", published in Signal Processing, Communication and Computing (ICSPCC), 2013, 4 pages.

Korycki, Rafal, "Authenticity examination of compressed audio recordings using detection of multiple compression and encoders' identification", published in Forensic Science International, Feb. 7, 2014, 14 pages.

(56) References Cited

OTHER PUBLICATIONS

Gartner et al., "Efficient Cross-Codec Framing Grid Analysis For Audio Tampering Detection", presented at the 136th Audio Engineering Society Convention, Apr. 26-29, 2014, 11 pages.
Luo et al., "Identifying Compression History of Wave Audio and Its Applications", published in ACM Transactions on Multimedia Computing, Communications and Applications, vol. 10, No. 3, Article 30, Apr. 2014, 19 pages.
xiph.org Foundation, "Vorbis I Specification", published Feb. 27, 2015, 74 pages.
Seichter et al., "MC Encoding Detection And Bitrate Estimation Using A Convolutional Neural Network", published in Acoustics, Speech and Signal Processing (ICASSP), 2016, 5 pages.
Hennequin et al., "Codec Independent Lossy Audio Compression Detection", published in Acoustics, Speech and Signal Processing (ICASSP), 2017, 5 pages.
Ikm et al., "Lossy Compression Identification from Audio Recordings, version 1", 5 pages.
Kim et al., "Lossy Compression Identification from Audio Recordings, version 2", 5 pages.
Barry Van Oudtshoorn, "Investigating the Feasibility of Near Real-Time Music Transcription on Mobile Devices," Honours Programme of the School of Computer Science and Software Engineering The University of Western Australia, 2008, 50 pages.
Eric Jacobsen and Richard Lyons, "Sliding Spectrum Analysis," Streamlining digital Signal Processing: A Tricks of the Trade Guidebook, IEEE, Chapter 14, 2007, 13 pages.
Eric Jacobsen and Richard Lyons, "An update to the sliding DFT," IEEE Signal Processing Magazine, 2004, 3 pages.
Eric Jacobsen and Richard Lyons, "The Sliding OFT," IEEE Signal Processing Magazine, 1053-5888, Mar. 2003, p. 74-80, 7 pages.
Haitham Hassanieh, Piotr Indvk, Dina Katabi, and Eric Price, "Simple and Practical Algorithm for Sparse FourierTransform," SODA '12 Proceedings of the Twenty-Third Annual Symposium on Discrete Algorithms, 12 pages.
Judith C. Brown and Millers. Puckette, "An efficient algorithm for the calculation of a constant Q transform," J. Acoust. Soc. Am. 92 (5), Nov. 1992, pp. 2698-2701, 4 pages.
Judith C. Brown, "Calculation of a constant Q spectral transform," J. Acoust. Soc. Am. 89 (1), Jan. 1991, pp. 425-434, 10 pages.
Steve Arar, "OFT Leakage and the Choice of the Window Function," Aug. 23, 2017, retrieved from www.allaboutcircuits.com/technical-articles, 11 pages.
Tom Springer, "Sliding FFT computes frequency spectra in real time," EON Magazine, Sep. 29, 1988, reprint taken from Electronic Circuits, Systems and Standards: The Best of EON, edited by Ian Hickman, 1991, 7 pages.
Kim et al., "Lossy Audio Compression Identification," 10.23919/EUSIPCO.2018.8553611, Conference: 2018 26th European Signal Processing Conference, {Sep. 2018), 2459-2463.
Kim et al. , "Lossy Audio Compression Identification (Poster)," 10.23919/EUSIPCO.2018.8553611, Conference: 2018 26th European Signal Processing Conference, {Sep. 2018), 1 page.
International Searching Authority, "International Search Report," issued in connection with application No. PCT/US2018/057183, on Feb. 13, 2019, 5 pages.
International Searching Authority, Written Opinion, issued in connection with application No. PCT/US2018/057183, on Feb. 12, 2019, 4 pages.
European Patent Office, "Extended European Search Report", issued in connection with EP Application No. 18871214.5, dated Jul. 2, 2021, 8 pages.
European Patent Office, "Communication Pursuant to Rules 70(2) and 70a(2) EPC", issued in connection with EP Application No. 18871214.5, dated Jul. 20, 2021, 1 page.
Korean Intellectual Preperty Office, "Notice of Preliminary Rejection", issued in connection with KR Application No. 10-2020-7012223, mailed on Aug. 5, 2021, 15 pages. (English Translation Included).
Korean Intellectual Preperty Office, "Notice of Final Rejection", issued in connection with KR Application No. 10-2020-7012223, mailed on Feb. 21, 2022, 8 pages_ [English Translation Included].
Korean Intellectual Preperty Office, "Notice of Allowance", issued in connection with KR Application No. 10-2020-7012223, mailed on Apr. 26, 2022, 4 pages [English Translation Included].
Cho et al. "Coding History Detection of Speech Signal using Deep Neural Network", vol. 23, No. 1, dated Jan. 2018, 7 pages.

* cited by examiner

METHODS, APPARATUS, AND ARTICLES OF MANUFACTURE TO IDENTIFY SOURCES OF NETWORK STREAMING SERVICES

RELATED APPLICATIONS

This patent arises from U.S. application Ser. No. 17/360,605 (now U.S. Pat. No. 11,948,589), which is titled "METHODS, APPARATUS, AND ARTICLES OF MANUFACTURE TO IDENTIFY SOURCES OF NETWORK STREAMING SERVICES," and which was filed on Jun. 28, 2021, which is a continuation of U.S. application Ser. No. 16/238,189 (now U.S. Pat. No. 11,049,507), which is titled "METHODS, APPARATUS, AND ARTICLES OF MANUFACTURE TO IDENTIFY SOURCES OF NETWORK STREAMING SERVICES," and which was filed on Jan. 2, 2019, which is a continuation-in-part of U.S. patent application Ser. No. 15/793,543 (now U.S. Pat. No. 10,733,998), which is titled "METHODS, APPARATUS AND ARTICLES OF MANUFACTURE TO IDENTIFY SOURCES OF NETWORK STREAMING SERVICES," and which was filed on Oct. 25, 2017. U.S. application Ser. No. 16/238,189 and U.S. application Ser. No. 15/793,543 are hereby incorporated herein by reference in its entirety. Priority to U.S. application Ser. No. 16/238,189 and U.S. application Ser. No. 15/793,543 is claimed.

FIELD OF THE DISCLOSURE

This disclosure relates generally to network streaming services, and, more particularly, to methods, apparatus, and articles of manufacture to identify sources of network streaming services.

BACKGROUND

Audience measurement entities (AMEs) perform, for example, audience measurement, audience categorization, measurement of advertisement impressions, measurement of media exposure, etc., and link such measurement information with demographic information. AMEs can determine audience engagement levels for media based on registered panel members. That is, an AME enrolls people who consent to being monitored into a panel. The AME then monitors those panel members to determine media (e.g., television programs or radio programs, movies, DVDs, advertisements (ads), websites, etc.) exposed to those panel members.

Figure 1:
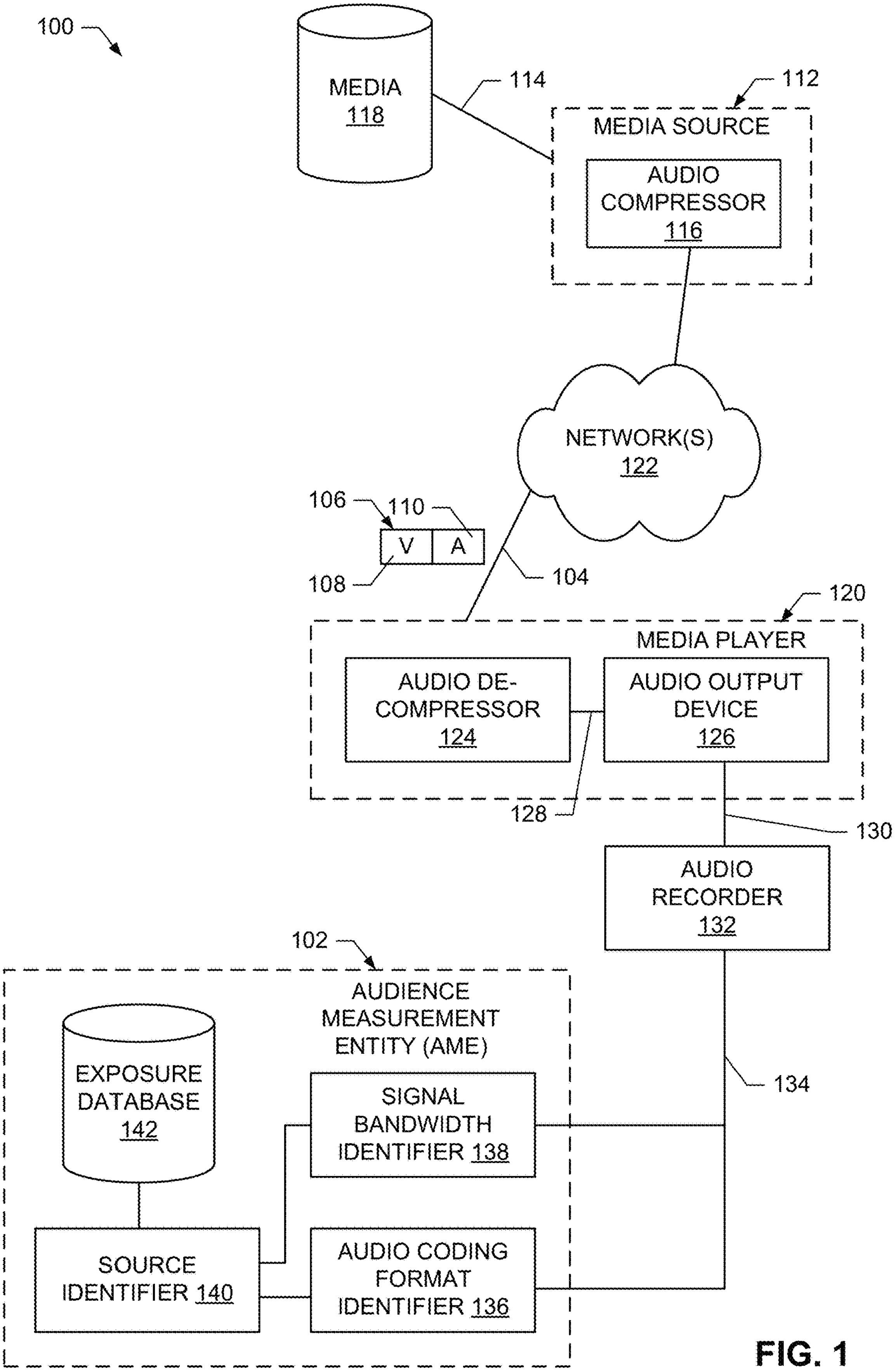
FIG. 1 illustrates an example environment in which an example AME, in accordance with this disclosure, identifies sources of network streaming services.

Wherever possible, the same reference numbers will be used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

AMEs typically identify the source of media (e.g., television programs or radio programs, movies, DVDs, advertisements (ads), websites, etc.) when measuring exposure to the media. In some examples, media has imperceptible audience measurement codes embedded therein (e.g., in an audio signal portion) that allow the media and a source of the media to be determined. However, media delivered via a network streaming service (e.g., NETFLIX®, HULU®, YOUTUBE®, AMAZON PRIME®, APPLE TV®, etc.) may not include audience measurement codes, rendering identification of media source difficult.

It has been advantageously discovered that, in some instances, different sources of streaming media (e.g., NETFLIX®, HULU®, YOUTUBE®, AMAZON PRIME®, APPLE TVR, etc.) use different audio compression configurations to store and stream the media they host. In some examples, an audio compression configuration is a set of one or more parameters, settings, etc. that define, among possibly other things, an audio coding format (e.g., a combination of an audio coder-decoder (codec) (MP1, MP2, MP3, AAC, AC-3, Vorbis, WMA, DTS, etc.), compression parameters, framing parameters, etc.), signal bandwidth, etc. Because different sources use different audio compression configurations, the sources can be distinguished (e.g., inferred, identified, detected, determined, etc.) based on the audio compression configuration applied to the media. While other methods may be used to distinguish between different sources of streaming media, for simplicity of explanation, the examples disclosed herein assume that different sources are associated with at least different audio compression configurations. The media is de-compressed during playback.

In some examples, an audio compression configuration can be identified from media that has been de-compressed and output using an audio device such as a speaker, and recorded. The recorded audio, which has undergone lossy compression and de-compression, can be re-compressed according to different trial audio coding formats, and/or have its signal bandwidth determined. In some examples, the de-compressed audio signal is (re-)compressed using different trial audio coding formats for compression artifacts. Because compression artifacts become detectable (e.g., perceptible, identifiable, distinct, etc.) when a particular audio coding format matches the audio coding format used during the original encoding, the presence of compression artifacts can be used to identify one of the trial audio coding formats as the audio coding format used originally. While examples disclosed herein only partially re-compress the audio (e.g., perform only the time-frequency analysis stage of compression), full re-compression may be performed.

After the audio coding format is identified, the AME can infer the original source of the audio. Example compression artifacts are discontinuities between points in a spectrogram, a plurality of points in a spectrogram that are small (e.g., below a threshold, relative to other points in the spectrogram), one or more values in a spectrogram having probabilities of occurrence that are disproportionate compared to other values (e.g., a large number of small values), etc. In instances where two or more sources use the same audio coding format and are associated with compression artifacts, the audio coding format may be used to reduce the number of sources to consider. In such examples, other audio compression configuration aspects (e.g., signal bandwidth) can be used to further distinguish between sources.

Additionally, and/or alternatively, a signal bandwidth of the de-compressed audio signal can be used separately, or in combination, to infer the original source of the audio, and/or to distinguish between sources identified using other audio compression configuration settings (e.g., audio coding format). In some examples, the signal bandwidth is identified by computing frequency components (e.g., using a discrete Fourier transform (DFT), a fast Fourier transform (FFT), etc.) of the de-compressed audio signal. The frequency components are, for example, compared to a threshold to identify a high-frequency cut-off of the de-compressed audio signal. The high-frequency cut-off represents a signal bandwidth of the de-compressed audio signal, which can be used to infer the signal bandwidth of the original audio compression. The bandwidth of the original audio compression can be used to determine the source of the original audio, and/or to distinguish between sources identified using other audio compression configuration settings (e.g., audio coding format).

Additionally, and/or alternatively, combinations of audio compression configuration aspects can be used to infer the original source of audio. For example, a combination of any of signal bandwidth, audio coding format, audio codec, framing parameters, and/or compression parameters. In some examples, confidence scores are computed for components of an audio compression configuration and used to, for example, to compute a weighted sum, to compute a majority vote, etc. that is used to infer the original source of the audio.

Reference will now be made in detail to non-limiting examples of this disclosure, examples of which are illustrated in the accompanying drawings. The examples are described below by referring to the drawings.

FIG. 1 illustrates an example environment 100 in which an example AME 102, in accordance with this disclosure, identifies sources of network streaming services. To provide media 104 (e.g., a song, a movie 106 including video 108 and audio signal 110, a television show, a game, etc.), the example environment 100 includes one or more streaming media sources (e.g., NETFLIX®, HULU®, YOUTUBE®, AMAZON PRIME®, APPLE TV®, etc.), an example of which is designated at reference numeral 112. To form compressed audio signals (e.g., the audio signal 110 of the movie 106) from an audio signal 114, the example media source 112 includes an example audio compressor 116. In some examples, audio is compressed by the audio compressor 116 (or another compressor implemented elsewhere) and stored in the media data store 118 for subsequent recall and streaming. The audio signals may be compressed by the example audio compressor 116 using any number and/or type(s) of audio compression configurations, for example, audio coding formats (e.g., audio codecs (e.g., MP1, MP2, MP3, AAC, AC-3, Vorbis, WMA, DTS, etc.), compression parameters, framing parameters, etc.), signal bandwidth parameters, etc. Media may be stored in the example media data store 118 using any number and/or type(s) of data structure(s). The media data store 118 may be implemented using any number and/or type(s) of non-volatile, and/or volatile computer-readable storage device(s) and/or storage disk(s).

To present (e.g., playback, output, display, etc.) media, the example environment 100 of FIG. 1 includes any number and/or type(s) of example media presentation device, one of which is designated at reference numeral 120. Example media presentation devices 120 include, but are not limited to a gaming console, a personal computer, a laptop computer, a tablet, a smart phone, a television, a set-top box, or, more generally, any device capable of presenting media. The example media source 112 provides the media 104 (e.g., the movie 106 including the compressed audio signal 110) to the example media presentation device 120 using any number and/or type(s) of example public, and/or public network(s) 122 or, more generally, any number and/or type(s) of communicative couplings.

To present (e.g., playback, output, etc.) audio (e.g., a song, an audio portion of a video, etc.), the example media presentation device 120 includes an example audio de-compressor 124, and an example audio output device 126. The example audio de-compressor 124 de-compresses the audio signal 110 to form de-compressed audio 128. In some examples, the audio compressor 116 specifies to the audio de-compressor 124 in the compressed audio signal 110 the audio compression configuration used by the audio compressor 116 to compress the audio. The de-compressed audio 128 is output by the example audio output device 126 as an audible signal 130. Example audio output devices 126 include, but are not limited, a speaker, an audio amplifier, headphones, etc. While not shown, the example media presentation device 120 may include additional output devices, ports, etc. that can present signals such as video signals. For example, a television includes a display panel, a set-top box includes video output ports, etc.

To record the audible signal 130, the example environment 100 of FIG. 1 includes an example recorder 132. The example recorder 132 of FIG. 1 is any type of device capable of capturing, storing, and conveying the audible signal 130. In some examples, the recorder 132 is implemented by a people meter owned and operated by The Nielsen Company (US), LLC, the Applicant of this patent. In some examples, the media presentation device 120 is a device (e.g., a personal computer, a laptop, etc.) that can output the audible signal 130 and record the audible signal 130 with a connected or integral microphone. In some examples, the decompressed audio 128 is recorded without being output. Audio signals 134 recorded by the example recorder 132 are conveyed to the example AME 102 for analysis.

To identify the media source 112 associated with the audible signal 130, the example AME 102 includes one or more parameter identifiers (e.g., an example audio coding format identifier 136, an example signal bandwidth identifier 138, etc.) and an example source identifier 140. The example audio coding format identifier 136 of FIG. 1 identifies the audio coding applied by the audio compressor 116 to form the compressed audio signal 110. The audio coding format identifier 136 identifies the audio coding applied by audio compressor 116 from the audible signal 130 output by the audio output device 126, and recorded by the recorder 132. The recorded audio signal 134, which has undergone lossy compression at the audio compressor 116, and de-compression at the audio de-compressor 124 is re-compressed by the audio coding format identifier 136 according to different trial audio coding formats, types and/or settings. In some examples, the trial re-compression that results in the largest compression artifacts is identified by the audio coding format identifier 136 as the audio coding that was used at the audio compressor 116 to originally encode the media.

The example signal bandwidth identifier 138 of FIG. 1 identifies the signal bandwidth (e.g., a high-frequency cut-off) of the audible signal 130 output by the audio output device 126, and recorded by the recorder 132. The signal bandwidth of the audible signal 130 varies with the signal bandwidth (e.g., a high-frequency cutoff) that the media source 112 applied to the audio signal 114 when the audio compressor 116 formed the audio signal 110. Different media sources 112 form media 104 having different signal bandwidths.

The example source identifier 140 of FIG. 1 uses the identified audio coding format identified by the audio coding format identifier 136, and/or the signal bandwidth of the audible signal 130 identified by the signal bandwidth identifier 138 to identify the media source 112 of the media 104. In some examples, the source identifier 140 uses a lookup table to identify, or narrow the search space for identifying the media source 112 associated with an audio compression identified by the audio coding format identifier 136 and/or a signal bandwidth identified by the signal bandwidth identifier 138. An association of the media 104 and the media source 112, among other data (e.g., time, day, viewer, location, etc.) is recorded in an example exposure database 142 for subsequent development of audience measurement statistics.

Figure 2:
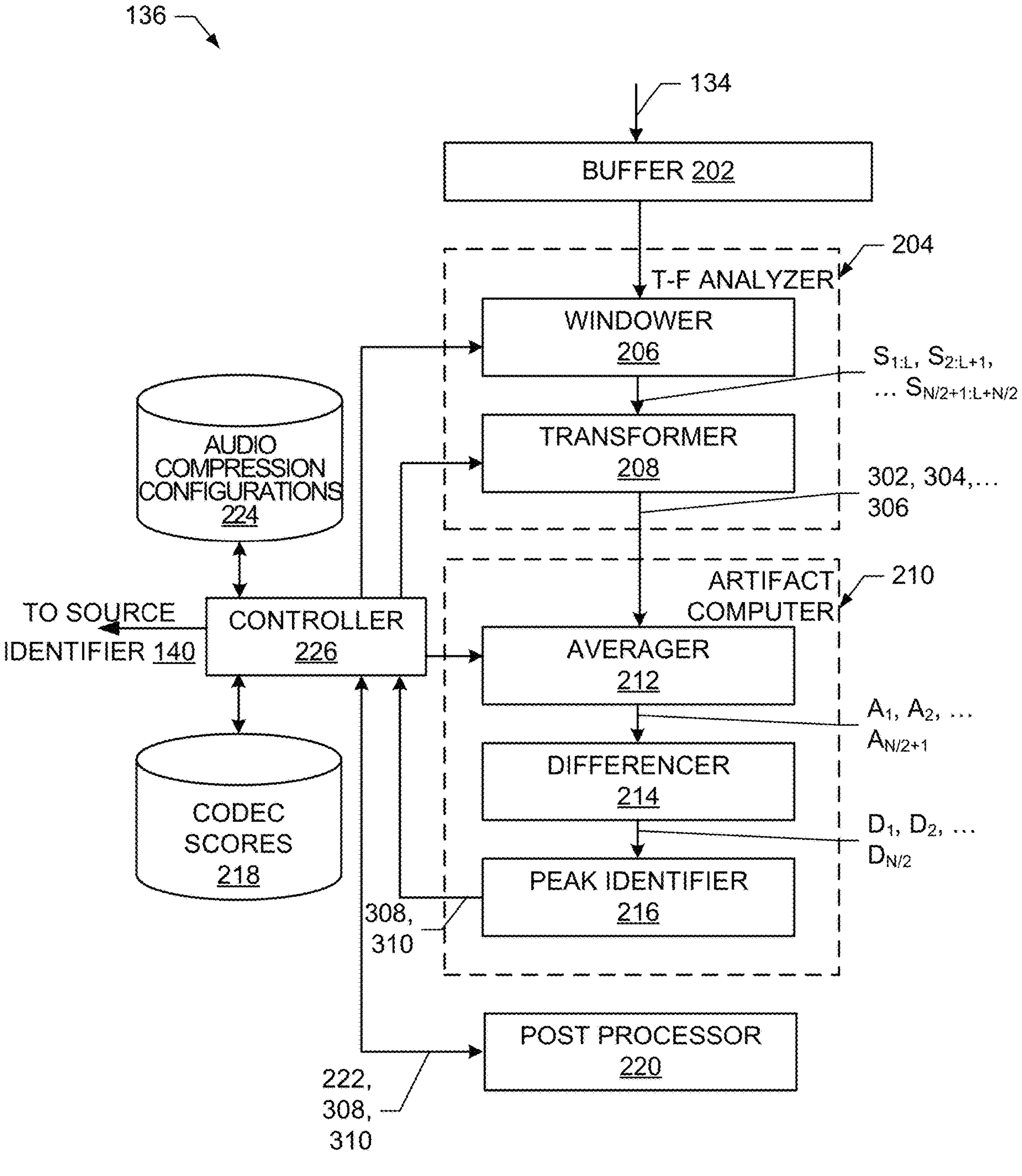
FIG. 2 is a block diagram illustrating an example implementation of the example audio coding format identifier of FIG. 1.
Figure 3:
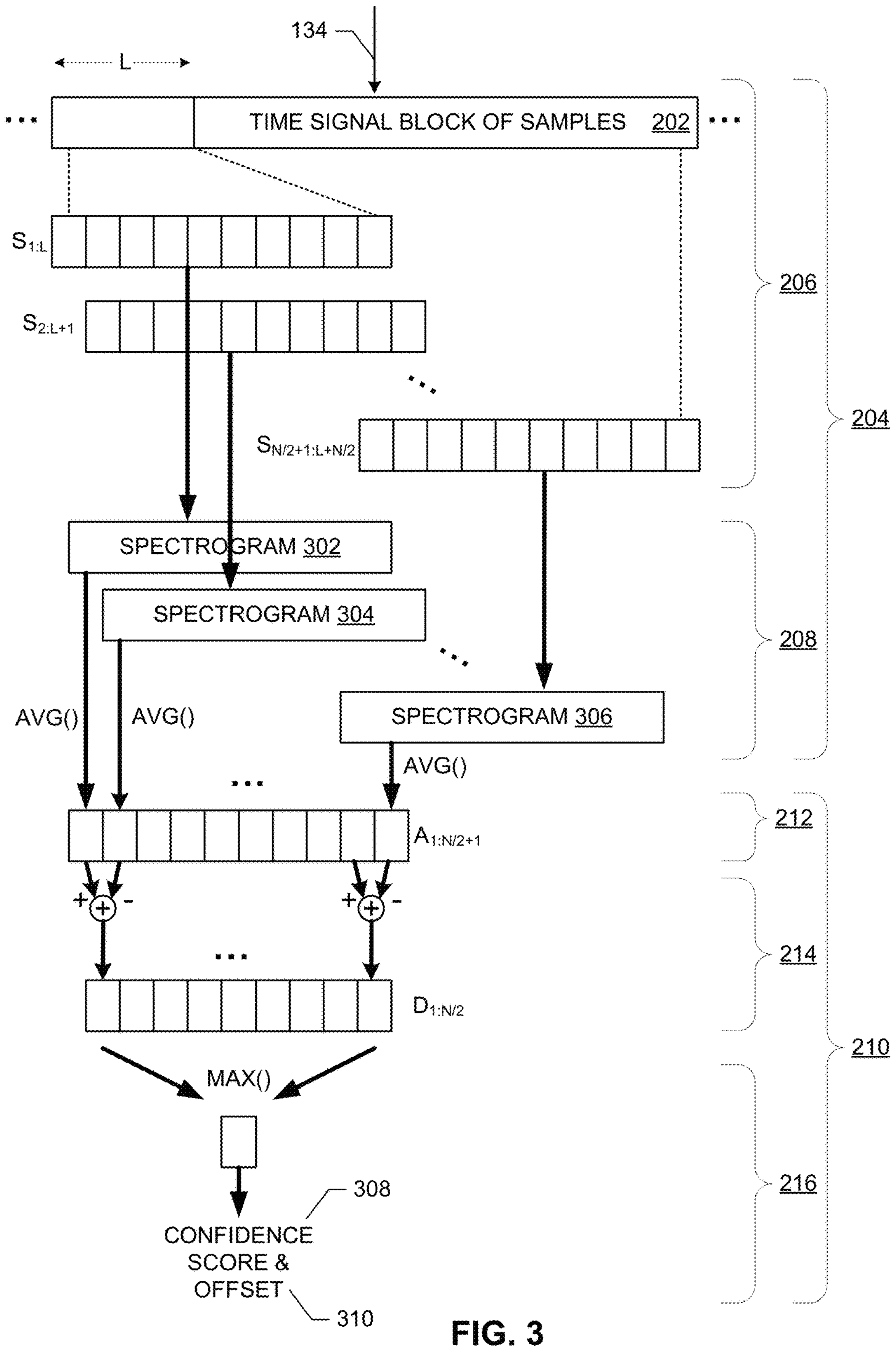
FIG. 3 is a diagram illustrating an example operation of the example audio coding format identifier of FIG. 2.

FIG. 2 is a block diagram illustrating an example implementation of the example audio coding format identifier 136 of FIG. 1. FIG. 3 is a diagram illustrating an example operation of the example audio coding format identifier 136 of FIG. 2. For ease of understanding, it is suggested that the interested reader refer to FIG. 3 together with FIG. 2. Wherever possible, the same reference numbers are used in FIGS. 2 and 3, and the accompanying written description to refer to the same or like parts.

To store (e.g., buffer, hold, etc.) incoming samples of the recorded audio signal 134, the example audio coding format identifier 136 includes an example buffer 202. The example buffer 202 of FIG. 2 may be implemented using any number and/or type(s) of non-volatile, and/or volatile computer-readable storage device(s) and/or storage disk(s).

To perform time-frequency analysis, the example audio coding format identifier 136 includes an example time-frequency analyzer 204. The example time-frequency analyzer 204 of FIG. 2 windows the recorded audio signal 134 into windows (e.g., segments of the buffer 202 defined by a sliding or moving window), and estimates the spectral content of the recorded audio signal 134 in each window.

To obtain portions of the example buffer 202, the example audio coding format identifier 136 includes an example windower 206. The example windower 206 of FIG. 2 is configurable to obtain from the buffer 202 windows $S_{1:L}$, $S_{2:L+1}$, . . . $S_{N/2+1:L+N/2}$ (e.g., segments, portions, etc.) of L samples of the recorded audio signal 134 to be processed. The example windower 206 obtains a specified number of samples starting with a specified starting offset 1, 2, N/2+1 in the buffer 202. The windower 206 can be configured to apply a windowing function to the obtained windows $S_{1:L}$, $S_{2:L+1}$, . . . $S_{N/2+1:L+N/2}$ of samples to reduce spectral leakage. Any number and/or type(s) of window functions may be implemented including, for example, a rectangular window, a sine window, a slope window, a Kaiser-Bessel derived window, etc.

To convert the samples obtained and windowed by the windower 206 to a spectrogram (three of which are designated at reference numeral 302, 304 and 306), the example coding format identifier 136 of FIG. 2 includes an example transformer 208. Any number and/or type(s) of transforms may be computed by the transformer 208 including, but not limited to, a polyphase quadrature filter (PQF), a modified discrete cosine transform (MDCT), hybrids thereof, etc. The example transformer 208 transforms each window $S_{1L}$, $S_{2:L+1}$, . . . $S_{N/2+1:L+N/2}$ into a corresponding spectrogram 302, 304, . . . 306.

To compute compression artifacts, the example audio coding format identifier 136 of FIG. 2 includes an example artifact computer 210. The example artifact computer 210 of FIG. 2 detects small values (e.g., values that have been quantized to zero) in the spectrograms 302, 304 and 306. Small values in the spectrograms 302, 304 and 306 represent compression artifacts, and are used, in some examples, to determine when a trial audio coding format corresponds to the audio coding format applied by the audio compressor 116 (FIG. 1).

To compute an average of the values of a spectrogram 302, 304 and 306, the artifact computer 210 of FIG. 2 includes an example averager 212. The example averager 212 of FIG. 2 computes an average $A_1$, $A_2$, . . . $A_{N/2+1}$ of the values of corresponding spectrograms 302, 304 and 306 for the plurality of windows $S_{1:L}$, $S_{2:L+1}$, . . . $S_{N/2+1:L+N/2}$ of the block of samples 202. The averager 212 can compute various means, such as, an arithmetic mean, a geometric mean, etc. Assuming the audio content stays approximately the same between two adjacent spectrograms 302, 304, . . . 306, the averages $A_1$, $A_2$, . . . $A_{N/2+1}$ will also be similar. However, when audio codec and framing match those used at the audio compressor 116, small values will appear in a particular spectrogram 302, 304 and 306, and differences $D_1$, $D_2$, . . . $D_{N/2}$ between the averages $A_1$, $A_2$, . . . $A_{N/2+1}$ will occur. The presence of these small values in a spectrogram 302, 304 and 306 and/or differences $D_1$, $D_2$, . . . $D_{N/2}$ between averages $A_1$, $A_2$, . . . $A_{N/2+1}$ can be used, in some examples, to identify when a trial audio coding format results in compression artifacts.

To detect the small values, the example artifact computer 210 includes an example differencer 214. The example differencer 214 of FIG. 2 computes the differences $D_1$, $D_2$, . . . $D_{N/2}$ (see FIG. 3) between averages $A_1$, $A_2$, . . . $A_{N/2+1}$ of the spectrograms 302, 304 and 306 computed using different window locations 1, 2, . . . N/2+1. When a spectrogram 302, 304 and 306 has small values representing potential compression artifacts, it will have a smaller spectrogram average $A_1$, $A_2$, . . . $A_{N/2+1}$ than the spectrograms 302, 304 and 306 for other window locations. Thus, its differences $D_1$, $D_2$, . . . $D_{N/2}$ from the spectrograms 302, 304 and 306 for the other window locations will be larger than differences $D_1$, $D_2$, . . . $D_{N/2}$ between other pairs of spectrograms 302, 304 and 306. In some examples, the differencer 214 computes absolute (e.g., positive valued) differences.

To identify the largest difference $D_1$, $D_2$, . . . $D_{N/2}$ between the averages $A_1$, $A_2$, . . . $A_{N/2+1}$ of spectrograms 302, 304 and 306, the example artifact computer 210 of FIG. 2 includes an example peak identifier 216. The example peak identifier 216 of FIG. 2 identifies the largest difference $D_1$, $D_2$, . . . $D_{N/2}$ for a plurality of window locations 1, 2, . . . N/2+1. The largest difference $D_1$, $D_2$, . . . $D_{N/2}$ corresponding to the window location 1, 2, . . . N/2+1 used by the audio compressor 116. As shown in the example of FIG. 3, the peak identifier 216 identifies the difference $D_1$, $D_2$, . . . $D_{N/2}$ having the largest value. As will be explained below, in some examples, the largest value is considered a confidence score 308 (e.g., the greater its value the greater the confidence that a compression artifact was found), and is associated with an offset 310 (e.g., 1, 2, . . . , N/2+1) that represents the location of the window $S_{1:L}$, $S_{2:L+1}$, . . . $S_{N/2+1:L+N/2}$ associated with the average $A_1$, $A_2$, . . . $A_{N/2+1}$. The example peak identifier 216 stores the confidence score 308 and the offset 310 in a coding format scores data store 218. The confidence score 308 and the offset 310 may be stored in the example coding format scores data store 218 using any number and/or type(s) of data structure(s). The coding format scores data store 218 may be implemented using any number and/or type(s) of non-volatile, and/or volatile computer-readable storage device(s) and/or storage disk(s).

Figure 4:
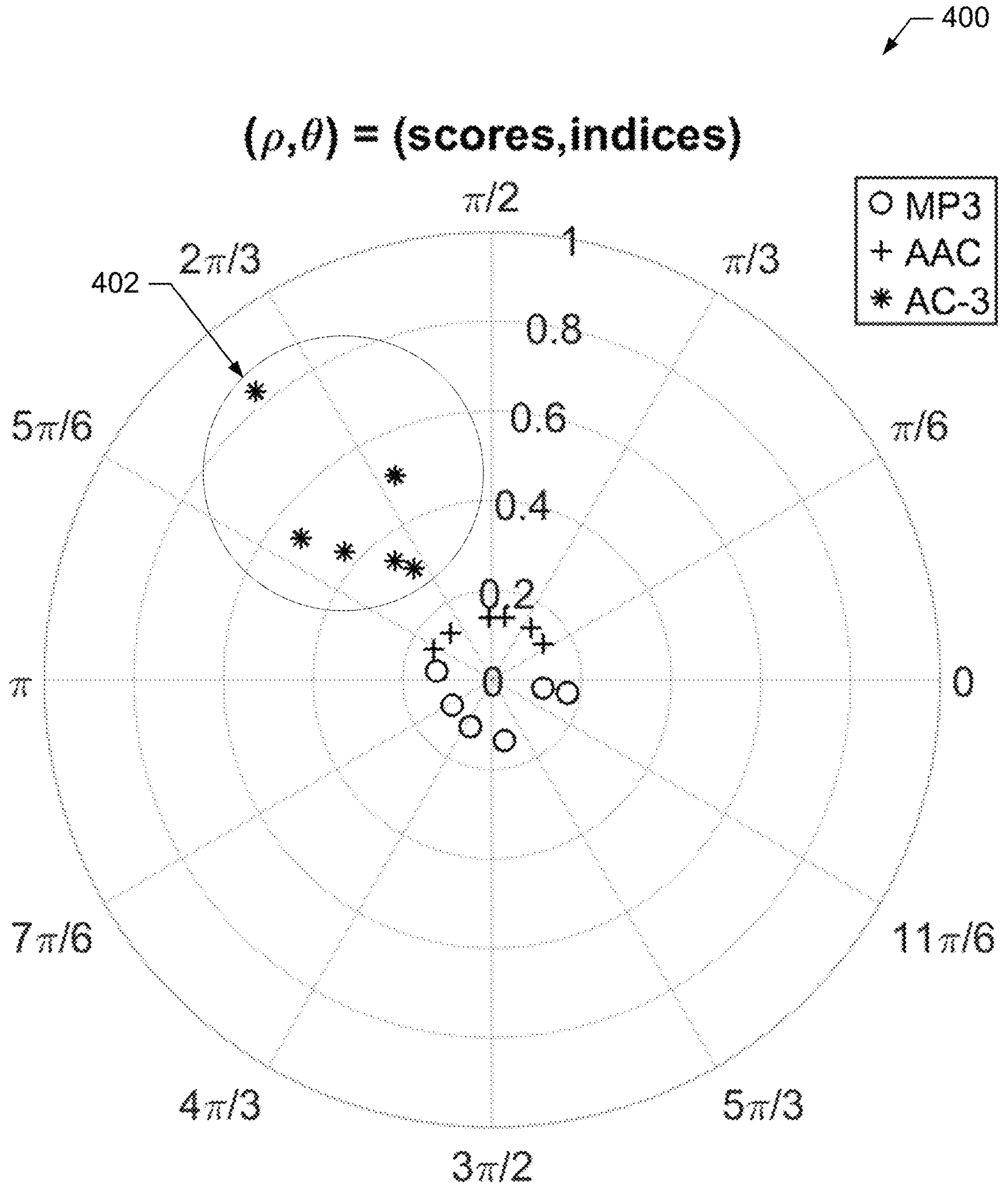
FIG. 4 is an example polar graph of example scores and offsets.

A peak in the differences $D_1$, $D_2$, . . . $D_{N/2}$ nominally occurs every T samples in the signal. In some examples, T is the hop size of the time-frequency analysis stage of a coding format, which is typically half of the window length L. In some examples, confidence scores 308 and offsets 310 from multiple blocks of samples of a longer audio recording are combined to increase the accuracy of coding format identification. In some examples, blocks with scores under a chosen threshold are ignored. In some examples, the threshold can be a statistic computed from the differences, for example, the maximum divided by the mean. In some examples, the differences can also be first normalized, for example, by using the standard score. To combine confidence scores 308 and offsets 310, the example audio coding format identifier 136 includes an example post processor 220. The example post processor 220 of FIG. 2 translates pairs of confidence scores 308 and offsets 310 into polar coordinates. In some examples, a confidence score 308 is translated into a radius (e.g., expressed in decibels), and an offset 310 is mapped to an angle (e.g., expressed in radians modulo its periodicity). In some examples, the example post processor 220 computes a circular mean of these polar coordinate points (i.e., a mean computed over a circular region about an origin), and obtains an average polar coordinate point whose radius corresponds to an overall confidence score 222. In some examples, a circular sum can be computed, by multiplying the circular mean by the number of blocks whose scores was above the chosen threshold. The closer the pairs of points are to each other in the circle, and the further they are from the center, the larger the overall confidence score 222. In some examples, the post processor 220 computes a circular sum by multiplying the circular mean and the number of blocks whose scores were above the chosen threshold. The example post processor 220 stores the overall confidence score 222 in the coding format scores data store 218 using any number and/or type(s) of data structure(s). An example polar plot 400 of example pairs of scores and offsets is shown in FIG. 4, for three different audio codecs: MP3, AAC and AC-3. As shown in FIG. 4, the AC-3 codec has a plurality of points (e.g., see the example points in the example region 402) having similar angles (e.g., similar window offsets), and larger scores (e.g., greater radiuses) than the other audio codecs. If a circular mean is computed for each audio codec, the means for MP3 and AAC would be near the origin, while the mean for AC-3 would be distinct from the origin, indicating that the audio signal 134 was originally compressed with the AC-3 audio codec.

To store sets of audio compression configurations, the example coding format identifier 136 of FIG. 2 includes an example audio compression configurations data store 224. To control audio coding format identification, the example audio coding format identifier 136 of FIG. 2 includes an example controller 226. To identify the audio coding format applied to the audio signal 134, the example controller 226 configures the time-frequency analyzer 204 with different audio coding formats. For combinations of a trial audio coding format (e.g., AC-3 codec) and each of a plurality of window offsets, the time-frequency analyzer 204 computes a spectrogram 302, 304 and 306. The example artifact computer 210 and the example post processor 220 determine the overall confidence score 222 for each the trial audio coding formats. The example controller 226 identifies (e.g., selects) the one of the trial audio coding formats having the largest overall confidence score 222 as the audio coding format that had been applied to the audio signal 134.

The audio compression configurations may be stored in the example audio compression configurations data store 224 using any number and/or type(s) of data structure(s). The audio compression configurations data store 224 may be implemented using any number and/or type(s) of non-volatile, and/or volatile computer-readable storage device(s) and/or storage disk(s). The example controller 226 of FIG. 2 may be implemented using, for example, one or more of each of a circuit, a logic circuit, a programmable processor, a programmable controller, a graphics processing unit (GPU), a digital signal processor (DSP), an application specific integrated circuit (ASIC), a programmable logic device (PLD), a field programmable gate array (FPGA), and/or a field programmable logic device (FPLD).

While an example implementation of the coding format identifier 136 is shown in FIG. 2, other implementations, such as machine learning, etc. may additionally, and/or alternatively, be used. While an example manner of implementing the audio coding format identifier 136 of FIG. 1 is illustrated in FIG. 2, one or more of the elements, processes and/or devices illustrated in FIG. 2 may be combined, divided, re-arranged, omitted, eliminated and/or implemented in any other way. Further, the example time-frequency analyzer 204, the example windower 206, the example transformer 208, the example artifact computer 210, the example averager 212, the example differencer 214, the example peak identifier 216, the example post processor 220, the example controller 226 and/or, more generally, the example audio coding format identifier 136 of FIG. 2 may be implemented by hardware, software, firmware and/or any combination of hardware, software and/or firmware. Thus, for example, any of the example time-frequency analyzer 204, the example windower 206, the example transformer 208, the example artifact computer 210, the example averager 212, the example differencer 214, the example peak identifier 216, the example post processor 220, the example controller 226 and/or, more generally, the example audio coding format identifier 136 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of the example, time-frequency analyzer 204, the example windower 206, the example transformer 208, the example artifact computer 210, the example averager 212, the example differencer 214, the example peak identifier 216, the example post processor 220, the example controller 226, and/or the example audio coding format identifier 136 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example audio coding format identifier 136 of FIG. 1 may include one or more elements, processes and/or devices in addition to, or instead of, those illustrated in FIG. 2, and/or may include more than one of any or all the illustrated elements, processes and devices.

Figure 5:
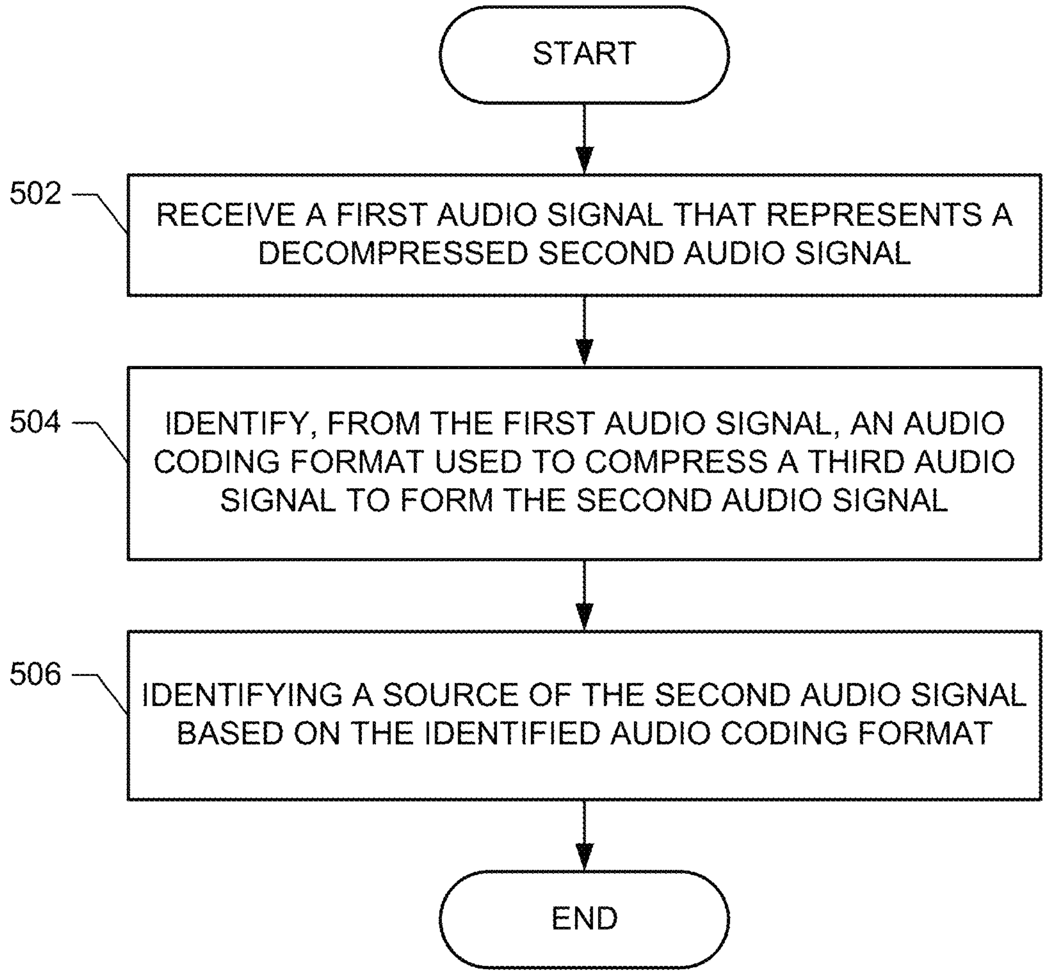
FIG. 5 is a flowchart representative of example hardware logic and/or machine-readable instructions to implement the example AME of FIG. 1 to identify sources of network streaming services.

A flowchart representative of example hardware logic, machine-readable instructions, hardware implemented state machines, and/or any combination thereof for implementing the example AME 102 of FIG. 1 is shown in FIG. 5. The machine-readable instructions of FIG. 5 may be an executable program or portion of an executable program for execution by a processor such as the processor 1310 shown in the example processor platform 1300 discussed below in connection with FIG. 13. The program may be embodied in software stored on a non-transitory computer-readable storage medium such as a CD, a compact disc read-only memory (CD-ROM), a floppy disk, a hard drive, a DVD, a Blu-ray disk, or a memory associated with the processor 1310, but the entire program and/or parts thereof could alternatively be executed by a device other than the processor 1310 and/or embodied in firmware or dedicated hardware. Further, although the example program is described with reference to the flowchart illustrated in FIG. 5, many other methods of implementing the example AME 102 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, FPGA(s), ASIC(s), comparator(s), operational-amplifier(s) (op-amp(s)), logic circuit(s), etc.) structured to perform the corresponding operation without executing software or firmware.

The example program of FIG. 5 begins at block 502, where the AME 102 receives a first audio signal (e.g., the example audio signal 134) that represents a decompressed second audio signal (e.g., the example audio signal 110) (block 502). The example audio coding format identifier 136 identifies, from the first audio signal, an audio coding format used to compress a third audio signal (e.g., the example audio signal 114) to form the second audio signal (block 504). The example source identifier 140 identifies a source of the second audio signal based on the identified audio coding format (block 506). Control exits from the example program of FIG. 5.

Figure 6:
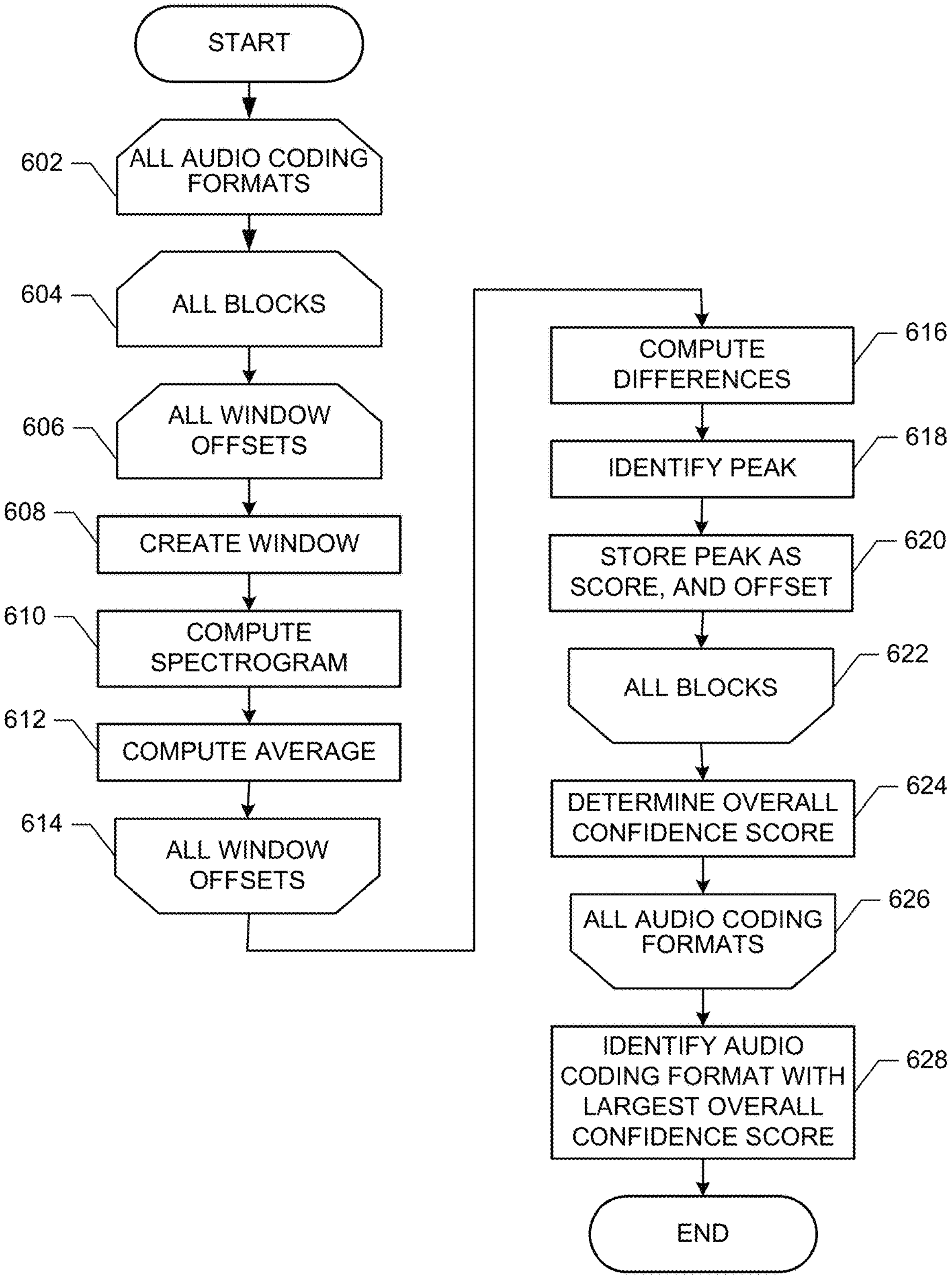
FIG. 6 is a flowchart representative of hardware logic and/or machine-readable instructions to implement the example audio coding format identifier of FIG. 1 and/or FIG. 2 to identify sources of network streaming services.

A flowchart representative of example hardware logic, machine-readable instructions, hardware implemented state machines, and/or any combination thereof for implementing the example audio coding format identifier 136 of FIGS. 1 and/or FIG. 2 is shown in FIG. 6. The machine-readable instructions may be an executable program or portion of an executable program for execution by a processor such as the processor 1310 shown in the example processor platform 1300 discussed below in connection with FIG. 13. The program may be embodied in software stored on a non-transitory computer-readable storage medium such as a CD, a CD-ROM, a floppy disk, a hard drive, a DVD, a Blu-ray disk, or a memory associated with the processor 1310, but the entire program and/or parts thereof could alternatively be executed by a device other than the processor 1310 and/or embodied in firmware or dedicated hardware. Further, although the example program is described with reference to the flowchart illustrated in FIG. 6, many other methods of implementing the example audio coding format identifier 136 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, FPGA(s), ASIC(s), comparator(s), operational-amplifier(s) (op-amp(s)), logic circuit(s), etc.) structured to perform the corresponding operation without executing software or firmware.

The example program of FIG. 6 begins at block 602, where for each trial audio coding format, each block 202 of samples (block 604), and each window offset M (block 606), the example windower 206 creates a window $S_{M:L+M}$ (block 608), and the example transformer 208 computes a spectrogram 302, 304 and 306 of the window $S_{M:L+M}$ (block 610). The average 212 computes an average $A_M$ of the spectrogram 302, 304 and 306 (block 612). When the average $A_M$ of a spectrogram 302, 304 and 306 has been computed for each window offset M (block 614), the example differencer 214 computes differences $D_1, D_2, \ldots D_{N/2}$ between the pairs of the averages $A_M$ (block 616). The example peak identifier 216 identifies the largest difference (block 618), and stores the largest difference as the confidence score 308 and the associated offset M as the offset 310 in the coding format scores data store 218 (block 620).

U.S. patent application Ser. No. 15/899,220, which was filed on Feb. 19, 2018, and U.S. patent application Ser. No. 15/942,369, which was filed on Mar. 30, 2018, disclose methods and apparatus for efficient computation of multiple transforms for different windowed portions, blocks, etc. of an input signal. For example, the teachings of U.S. patent application Ser. No. 15/899,220, and U.S. patent application Ser. No. 15/942,369 can be used to efficiently compute sliding transforms that can be used to reduce the computations needed to compute the transforms for different combinations of starting samples and window functions in, for example, block 606 to block 612 of FIG. 6. U.S. patent application Ser. No. 15/899,220, and U.S. patent application Ser. No. 15/942,369 are incorporated herein by reference in their entireties. U.S. patent application Ser. No. 15/899,220, and U.S. patent application Ser. No. 15/942,369 are assigned to The Nielsen Company (US), LLC, the assignee of this patent.

When all blocks have been processed (block 622), the example post processor 220 translates the confidence score 308 and offset 310 pairs for the currently considered trial audio coding format set into polar coordinates, and computes a circular mean of the pairs in polar coordinates as an overall confidence score for the currently considered audio coding format (block 624).

When all trial audio coding formats have been processed (block 626), the controller 226 identifies the trial audio coding format with the largest overall confidence score as the audio coding format applied by the audio compressor 116 (block 628). Control then exits from the example program of FIG. 6.

Figure 7:
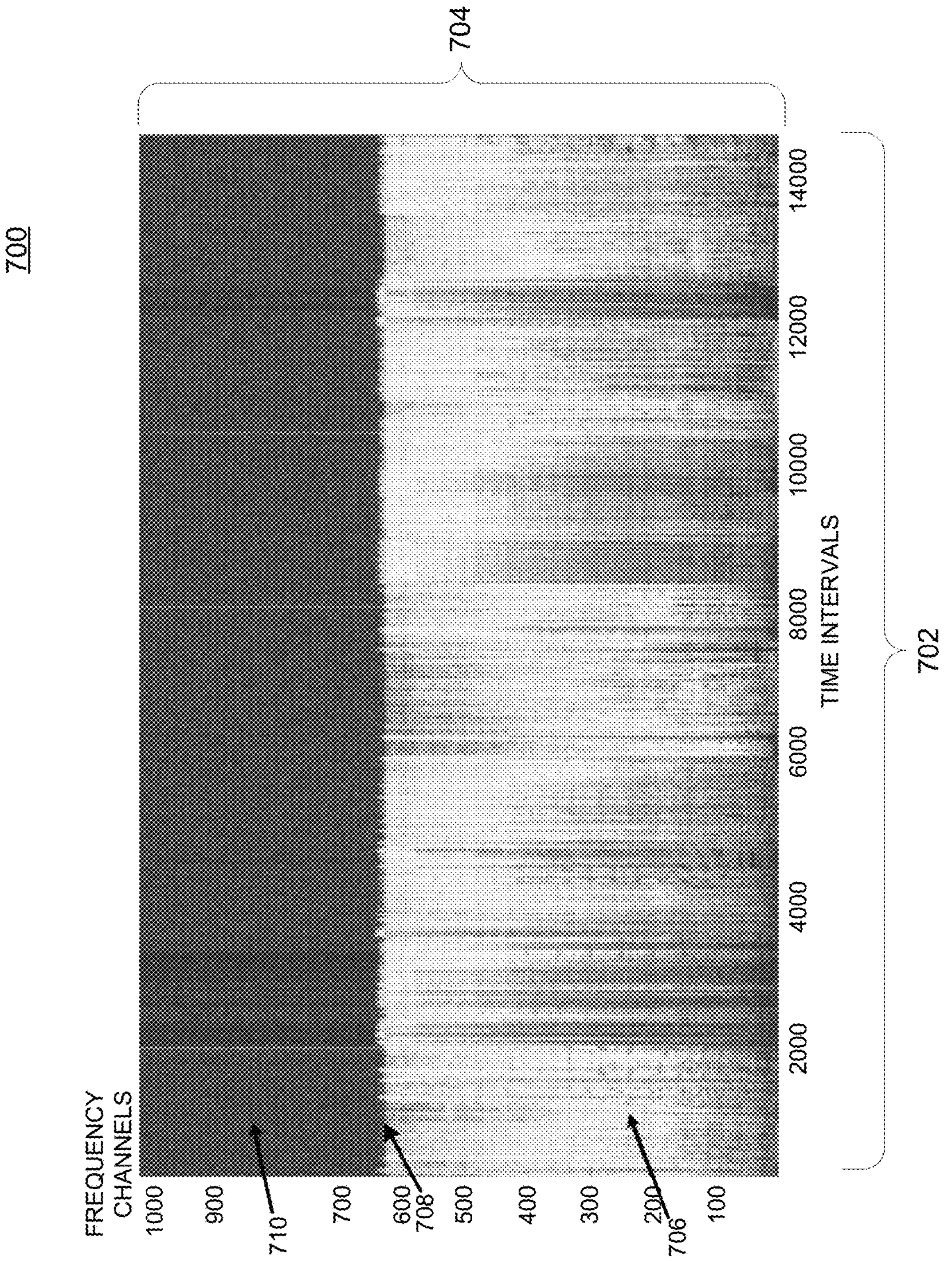
FIG. 7 is an example spectrogram graph of an audio signal.

FIG. 7 is an example spectrogram graph 700 of an example audio signal. The example spectrogram graph 700 of FIG. 7 is a visual representation of the spectrum of frequencies of sound (e.g., the audible signal 130) as they vary with time. The spectrogram graph 700 depicts for each of a plurality of time intervals 702 a respective frequency spectrum 704. The black and white variations within each frequency spectrum 704 represent the signal level at a particular frequency. In FIG. 7, white or gray represents a larger signal level than black. As shown in FIG. 7, across time, the sound is principally confined to frequencies in a first area 706 that is below a cutoff frequency 708, and is largely absent above the cutoff frequency 708 in an area 710. The cutoff frequency 708 can be used to classify the audible signal 130.

Figure 8:
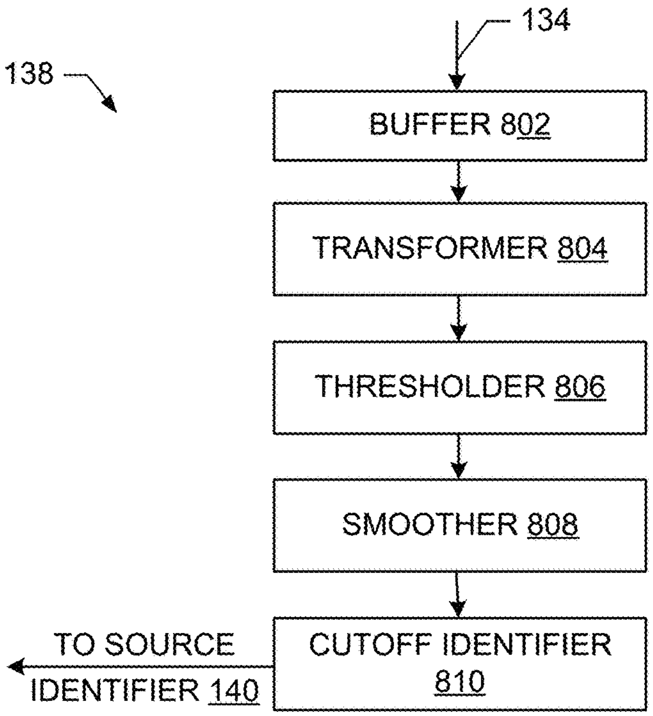
FIG. 8 is a block diagram illustrating an example implementation of the example signal bandwidth identifier of FIG. 1.

FIG. 8 is a block diagram illustrating an example implementation of the example signal bandwidth identifier 138 of FIG. 1. To store (e.g., buffer, hold, etc.) incoming samples of the recorded audio signal 134, the example signal bandwidth identifier 138 includes an example buffer 802. The example buffer 802 of FIG. 8 may be implemented using any number and/or type(s) of non-volatile, and/or volatile computer-readable storage device(s) and/or storage disk(s).

Figure 9:
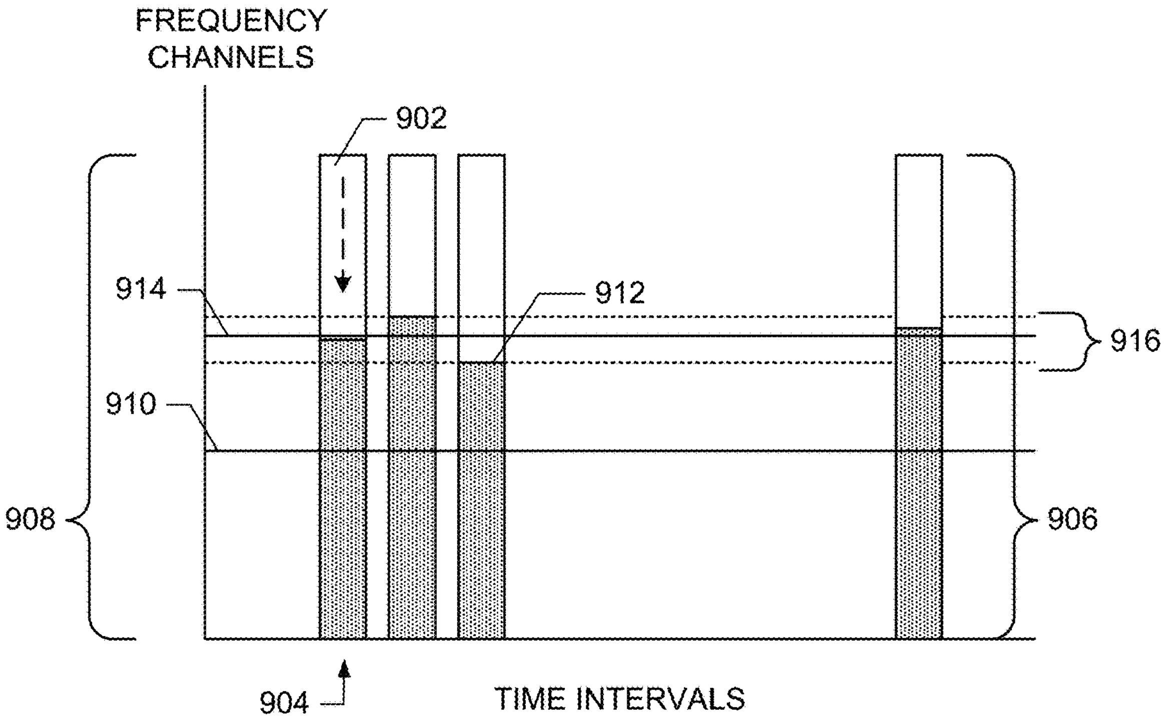
FIG. 9 is a diagram illustrating an example operation of the example signal bandwidth identifier of FIG. 8.

To compute signal frequency information, the example signal bandwidth identifier 138 includes an example transformer 804. The example transformer 804 of FIG. 8 computes a frequency spectrum (one of which is designated at reference numeral 902, see FIG. 9) for the samples of the recorded audio signal 134 for each time interval (one of which is designated at reference numeral 904). In some examples, the frequency spectrums 902 are computed using, for example, a DFT, a FFT, etc. Each frequency spectrum 902 has a plurality of values 906 for respective ones a plurality of frequencies 908 (one of which is designated at reference numeral 910). In some examples, frequency spectrums 902 are computed for overlapping time intervals 904 using, for example, a sliding window, a moving window, etc. In some examples, a window function is applied prior to computation of a frequency spectrum 902.

U.S. patent application Ser. No. 15/899,220, which was filed on Feb. 19, 2018, and U.S. patent application Ser. No. 15/942,369, which was filed on Mar. 30, 2018, disclose methods and apparatus for efficient computation of multiple transforms for different windowed portions, blocks, etc. of an input signal. For example, the teachings of U.S. patent application Ser. No. 15/899,220, and U.S. patent application Ser. No. 15/942,369 can be used to efficiently compute sliding transforms that can be used to reduce the computations needed to compute the transforms for different window locations and/or window functions in, for example, the transformer 804 of FIG. 8. U.S. patent application Ser. No. 15/899,220, and U.S. patent application Ser. No. 15/942,369 are incorporated herein by reference in their entireties. U.S. patent application Ser. No. 15/899,220, and U.S. patent application Ser. No. 15/942,369 are assigned to The Nielsen Company (US), LLC, the assignee of this patent.

To identify the cutoff frequency for each frequency spectrum 902 (one of which is designated at reference numeral 912), the example signal bandwidth identifier 138 includes an example thresholder 806. The example thresholder 806 of FIG. 8 compares each of the values 906 for each time interval 904 with a threshold. Starting with the value 906 associated with the highest frequency of the frequencies 908 for a time interval 904, the thresholder 806 successively compares values 906 with the threshold to identify the index into the values 906 that represents the highest frequency that has a value that is greater than the threshold (e.g., satisfies a threshold criteria) as the frequency cutoff 912 for the time interval 904.

To reduce noise, the example signal bandwidth identifier 138 includes an example smoother 808. The example smoother 808 of FIG. 8 computes a median 914 of the frequency cutoffs 916 that represents an overall cutoff frequency for the recorded audio signal 134.

To identify the overall cutoff frequency for the recorded audio signal 134, the example signal bandwidth identifier 138 includes an example cutoff identifier 810. The example cutoff identifier 810 of FIG. 8 identifies the cutoff frequency as the frequency associated with the median 914 based on the frequencies associated with the values 906. The example cutoff identifier 810 provides the identified overall cutoff frequency to the source identifier 140 as an identified signal bandwidth.

While an example implementation of the signal bandwidth identifier 138 is shown in FIG. 8, other implementations, such as machine learning, etc. may additionally, and/or alternatively, be used. While an example manner of implementing the signal bandwidth identifier 138 of FIG. 1 is illustrated in FIG. 8, one or more of the elements, processes and/or devices illustrated in FIG. 8 may be combined, divided, re-arranged, omitted, eliminated and/or implemented in any other way. Further, the example transformer 804, the example thresholder 806, the example smoother 808, the example cutoff identifier 810 and/or, more generally, the example signal bandwidth identifier 138 of FIG. 8 may be implemented by hardware, software, firmware and/or any combination of hardware, software and/or firmware. Thus, for example, any of the example transformer 804, the example thresholder 806, the example smoother 808, the example cutoff identifier 810 and/or, more generally, the example signal bandwidth identifier 138 of FIG. 8 could be implemented by one or more analog or digital circuit(s), logic circuits, programmable processor(s), programmable controller(s), GPU(s), DSP(s), ASIC(s), PLD(s), FPGA(s), and/or FPLD(s). When reading any of the apparatus or system claims of this patent to cover a purely software and/or firmware implementation, at least one of the example transformer 804, the example thresholder 806, the example smoother 808, the example cutoff identifier 810 and/or the example signal bandwidth identifier 138 is/are hereby expressly defined to include a non-transitory computer-readable storage device or storage disk such as a memory, a DVD, a CD, a Blu-ray disk, etc. including the software and/or firmware. Further still, the example signal bandwidth identifier 138 of FIG. 1 may include one or more elements, processes and/or devices in addition to, or instead of, those illustrated in FIG. 8, and/or may include more than one of any or all the illustrated elements, processes and devices.

Figure 10:
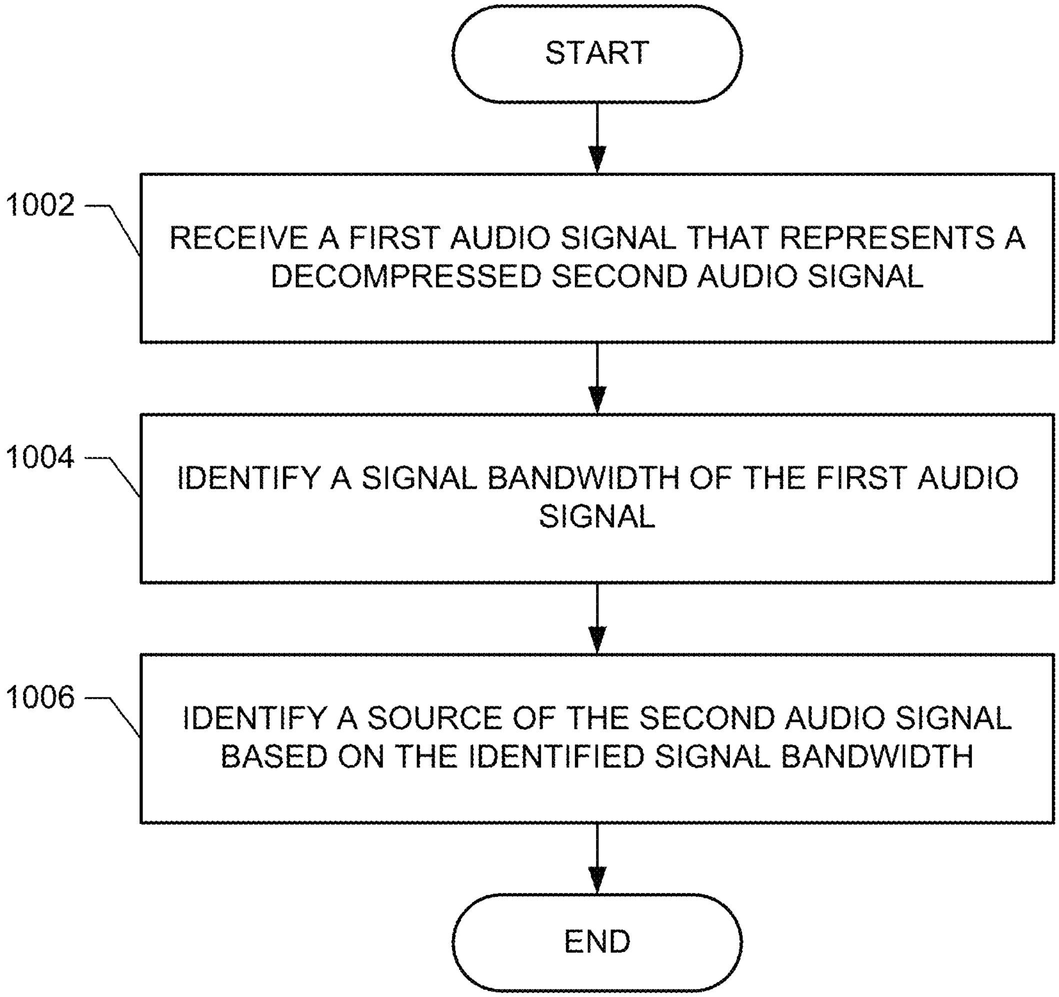
FIG. 10 is another flowchart representative of hardware logic and/or machine-readable instructions to implement the example AME of FIG. 1 to identify sources of network streaming services.

A flowchart representative of example hardware logic, machine-readable instructions, hardware implemented state machines, and/or any combination thereof for implementing the example AME 102 of FIG. 1 is shown in FIG. 10. The machine-readable instructions of FIG. 10 may be an executable program or portion of an executable program for execution by a processor such as the processor 1310 shown in the example processor platform 1300 discussed below in connection with FIG. 13. The program may be embodied in software stored on a non-transitory computer-readable storage medium such as a CD, a CD-ROM, a floppy disk, a hard drive, a DVD, a Blu-ray disk, or a memory associated with the processor 1310, but the entire program and/or parts thereof could alternatively be executed by a device other than the processor 1310 and/or embodied in firmware or dedicated hardware. Further, although the example program is described with reference to the flowchart illustrated in FIG. 10, many other methods of implementing the example AME 102 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, FPGA(s), ASIC(s), comparator(s), operational-amplifier(s) (op-amp(s)), logic circuit(s), etc.) structured to perform the corresponding operation without executing software or firmware.

The example program of FIG. 10 begins at block 1002, where the AME 102 receives a first audio signal (e.g., the example audio signal 134) that represents a decompressed a second audio signal (e.g., the example audio signal 110) (block 1002). The example signal bandwidth identifier 138 identifies a signal bandwidth of the second audio signal (block 1004). The example source identifier 140 identifies a source of the second audio signal based on the identified signal bandwidth (block 1006). Control exits from the example program of FIG. 10.

Figure 11:
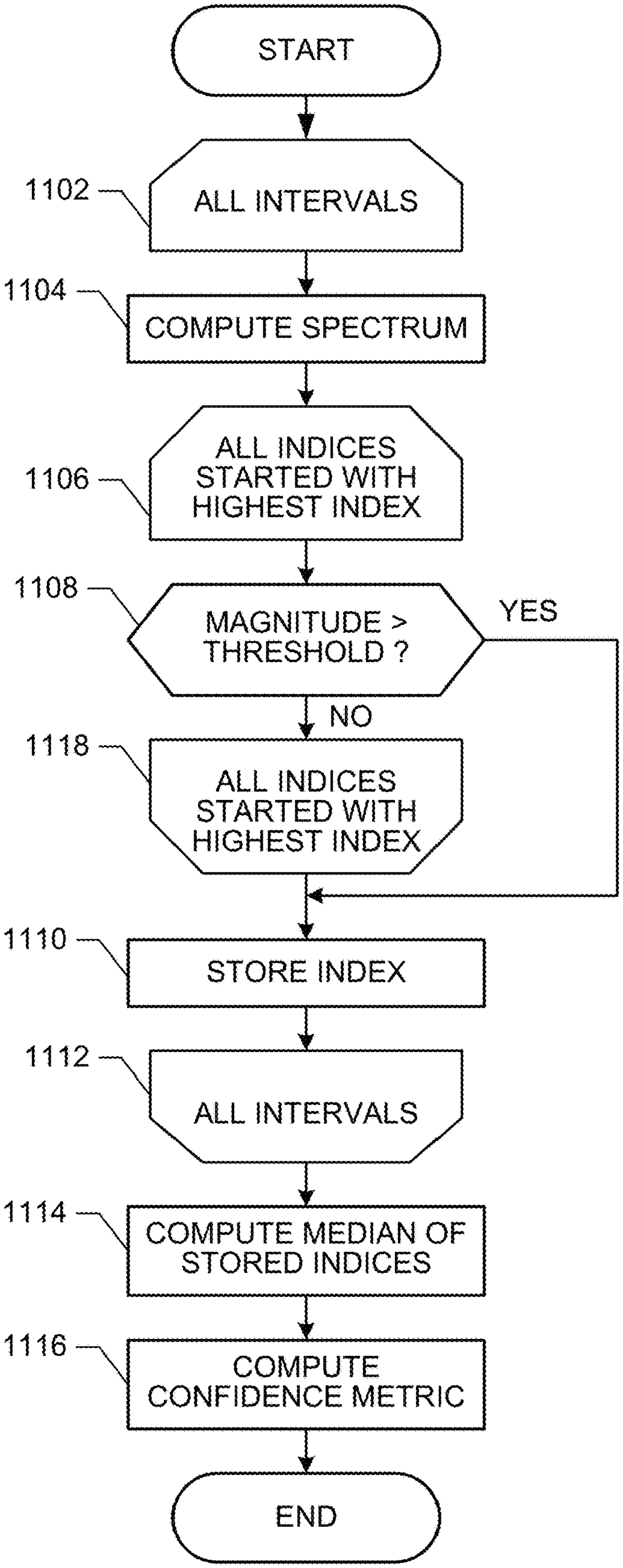
FIG. 11 is a flowchart representative of hardware logic and/or machine-readable instructions to implement the example signal bandwidth identifier of FIG. 1 and/or FIG. 8 to identify sources of network streaming services.

A flowchart representative of example hardware logic, machine-readable instructions, hardware implemented state machines, and/or any combination thereof for implementing the example signal bandwidth identifier 138 of FIGS. 1 and/or 8 is shown in FIG. 11. The machine-readable instructions may be an executable program or portion of an executable program for execution by a processor such as the processor 1310 shown in the example processor platform 1300 discussed below in connection with FIG. 13. The program may be embodied in software stored on a non-transitory computer-readable storage medium such as a CD, a CD-ROM, a floppy disk, a hard drive, a DVD, a Blu-ray disk, or a memory associated with the processor 1310, but the entire program and/or parts thereof could alternatively be executed by a device other than the processor 1310 and/or embodied in firmware or dedicated hardware. Further, although the example program is described with reference to the flowchart illustrated in FIG. 11, many other methods of implementing the example signal bandwidth identifier 138 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, FPGA(s), ASIC(s), comparator(s), operational-amplifier(s) (op-amp(s)), logic circuit(s), etc.) structured to perform the corresponding operation without executing software or firmware.

The example program of FIG. 11 begins at block 1102, where for each time interval 904 (block 1102), the transformer 804 computes a frequency spectrum 902 (block 1104). For all entries (e.g., values) 906 of the frequency spectrum 902 starting with the highest frequency (block 1106), the entry is compared to a threshold (block 1108). If the entry is greater than the threshold (block 1108), the index into the frequency spectrum 902 representing the entry is stored (block 1110). When an index has been stored for each time intervals 904 (block 1112), the smoother 808 computes a median of the stored indices (block 1114). In some examples, the signal bandwidth identifier 138 computes a confidence metric (block 1116). For example, a statistic representing the variation(s) among the stored entries. Returning to block 1108, if the entry is not greater than the threshold (block 1108), control proceeds to block 1118 to determine whether all entries have been processed.

Figure 12:
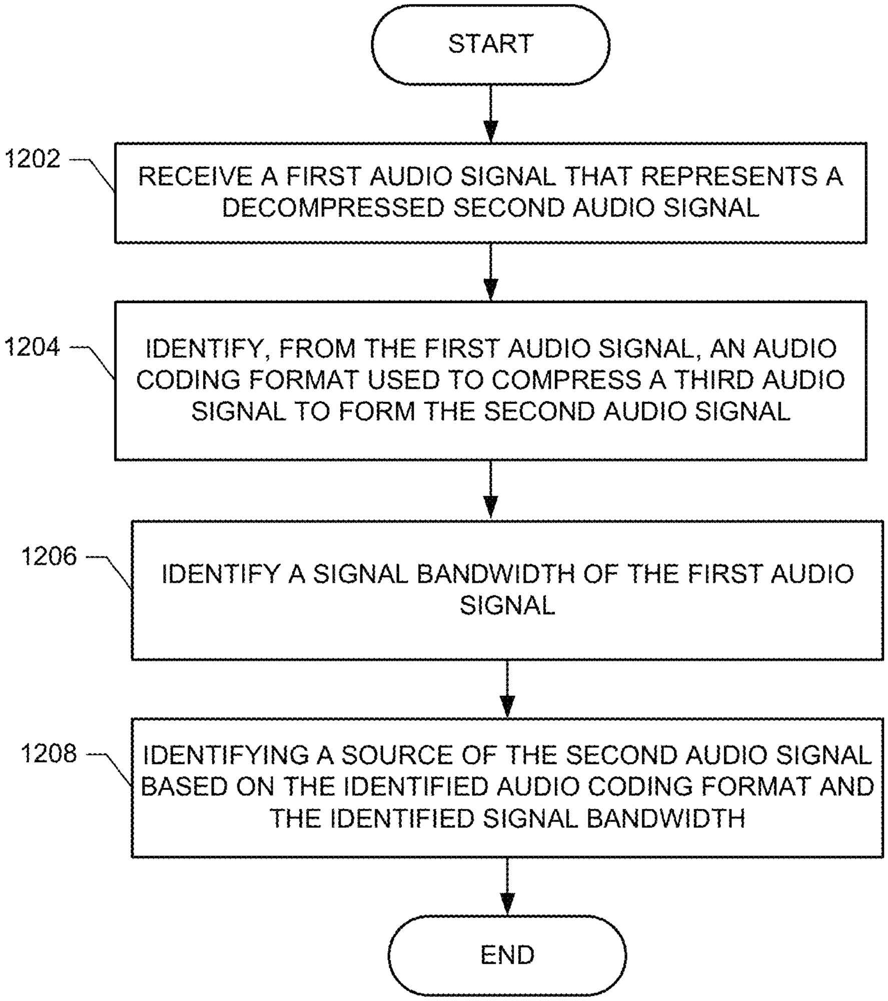
FIG. 12 is yet another flowchart representative of hardware logic and/or machine-readable instructions to implement the example AME of FIG. 1 to identify sources of network streaming services.

A flowchart representative of example hardware logic, machine-readable instructions, hardware implemented state machines, and/or any combination thereof for implementing the example AME 102 of FIG. 1 is shown in FIG. 12. The machine-readable instructions of FIG. 12 may be an executable program or portion of an executable program for execution by a processor such as the processor 1310 shown in the example processor platform 1300 discussed below in connection with FIG. 13. The program may be embodied in software stored on a non-transitory computer-readable storage medium such as a CD, a CD-ROM, a floppy disk, a hard drive, a DVD, a Blu-ray disk, or a memory associated with the processor 1310, but the entire program and/or parts thereof could alternatively be executed by a device other than the processor 1310 and/or embodied in firmware or dedicated hardware. Further, although the example program is described with reference to the flowchart illustrated in FIG. 12, many other methods of implementing the example AME 102 may alternatively be used. For example, the order of execution of the blocks may be changed, and/or some of the blocks described may be changed, eliminated, or combined. Additionally, and/or alternatively, any or all the blocks may be implemented by one or more hardware circuits (e.g., discrete and/or integrated analog and/or digital circuitry, FPGA(s), ASIC(s), comparator(s), operational-amplifier(s) (op-amp(s)), logic circuit(s), etc.) structured to perform the corresponding operation without executing software or firmware.

The example program of FIG. 12 begins at block 1202, where the AME 102 receives a first audio signal (e.g., the example audio signal 134) that represents a decompressed second audio signal (e.g., the example audio signal 110) (block 1202). The example audio coding format identifier 136 identifies, from the first audio signal, an audio coding format used to compress a third audio signal (e.g., the example audio signal 114) to form the second audio signal (block 1204). The example signal bandwidth identifier 138 identifies a signal bandwidth of the first audio signal (block 1206). The example source identifier 140 identifies a source of the second audio signal based on the identified audio coding format and the identified signal bandwidth (block 1208). Control exits from the example program of FIG. 12.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 13:
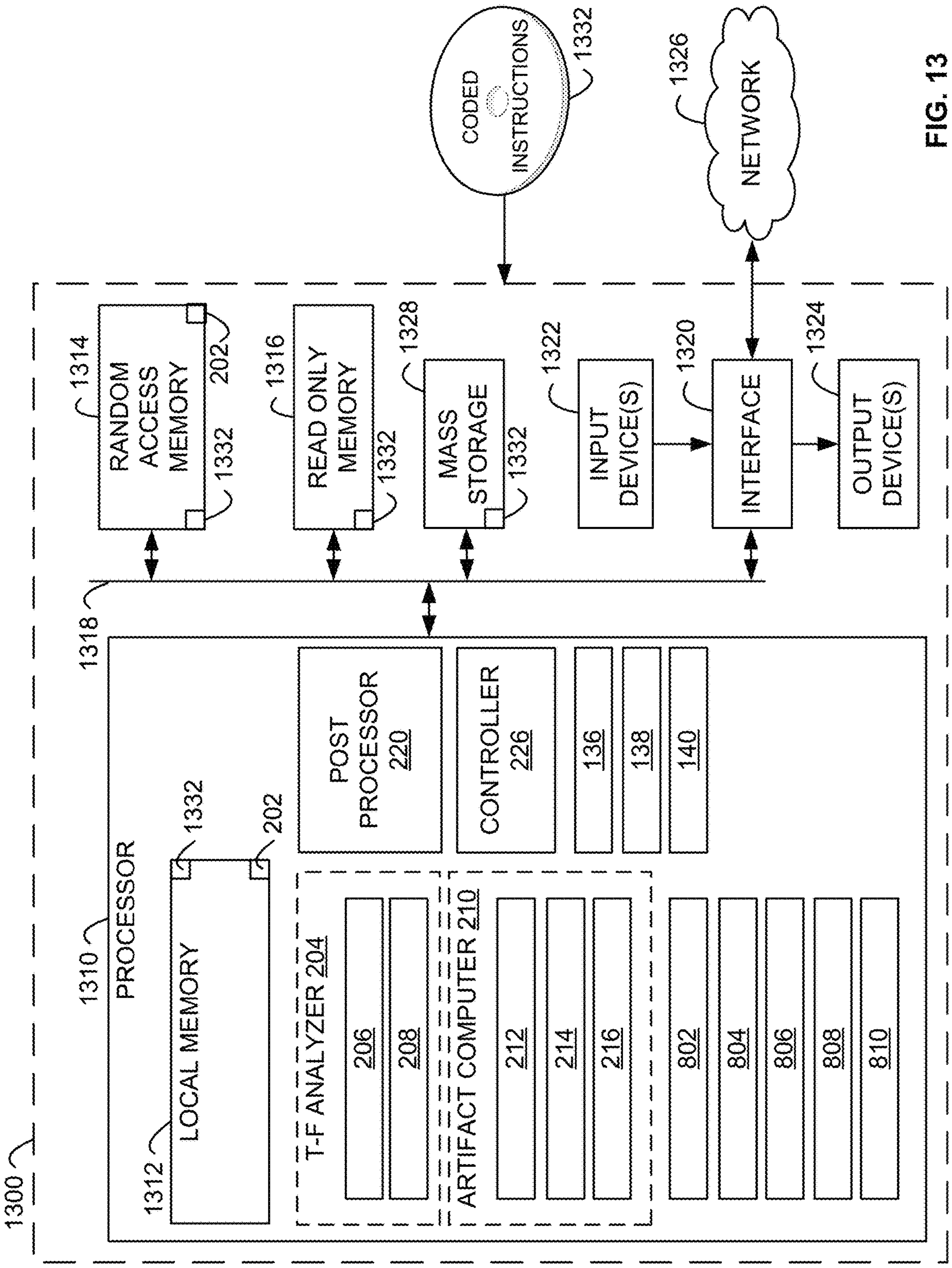
FIG. 13 illustrates an example processor platform structured to execute the example machine-readable instructions of FIGS. 5, 6 and 10-12 to implement the example AME of FIG. 1, the example audio coding format identifier of FIG. 1 and FIG. 2, and the example signal bandwidth identifier of FIG. 1 and FIG. 8.

FIG. 13 is a block diagram of an example processor platform 1300 capable of executing the instructions of FIG. 6 to implement the coding format identifier 136 of FIGS. 1 and/or 2. The processor platform 1300 can be, for example, a server, a personal computer, a workstation, or any other type of computing device.

The processor platform 1300 of the illustrated example includes a processor 1310. The processor 1310 of the illustrated example is hardware. For example, the processor 1310 can be implemented by one or more integrated circuits, logic circuits, microprocessors, GPUs, DSPs or controllers from any desired family or manufacturer. The hardware processor may be a semiconductor based (e.g., silicon based) device. In this example, the processor implements the example time-frequency analyzer 204, the example windower 206, the example transformer 208, the example artifact computer 210, the example averager 212, the example differencer 214, the example peak identifier 216, the example post processor 220, the example controller 226, the example transformer 804, the example thresholder 806, the example smoother 808, and the example cutoff identifier 810.

The processor 1310 of the illustrated example includes a local memory 1312 (e.g., a cache). The processor 1310 of the illustrated example is in communication with a main memory including a volatile memory 1314 and a non-volatile memory 1316 via a bus 1318. The volatile memory 1314 may be implemented by Synchronous Dynamic Random-access Memory (SDRAM), Dynamic Random-access Memory (DRAM), RAMBUS® Dynamic Random-access Memory (RDRAM®) and/or any other type of random-access memory device. The non-volatile memory 1316 may be implemented by flash memory and/or any other desired type of memory device. Access to the main memory 1314, 1316 is controlled by a memory controller (not shown). In this example, the local memory 1312 and/or the memory 1314 implements the buffer 202.

The processor platform 1300 of the illustrated example also includes an interface circuit 1320. The interface circuit 1320 may be implemented by any type of interface standard, such as an Ethernet interface, a universal serial bus (USB) interface, a Bluetooth® interface, a near field communication (NFC) interface, and/or a peripheral component interface (PCI) express interface.

In the illustrated example, one or more input devices 1322 are connected to the interface circuit 1320. The input device(s) 1322 permit(s) a user to enter data and/or commands into the processor 1310. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.) a tactile output device, a printer, and/or speakers. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, and/or network interface to facilitate exchange of data with external machines (e.g., computing devices of any kind) via a network 1326 (e.g., an Ethernet connection, a digital subscriber line (DSL), a telephone line, a coaxial cable, a cellular telephone system, a Wi-Fi system, etc.). In some examples of a Wi-Fi system, the interface circuit 1320 includes a radio frequency (RF) module, antenna(s), amplifiers, filters, modulators, etc.

The processor platform 1300 of the illustrated example also includes one or more mass storage devices 1328 for storing software and/or data. Examples of such mass storage devices 1328 include floppy disk drives, hard drive disks, CD drives, Blu-ray disk drives, redundant array of independent disks (RAID) systems, and DVD drives.

Coded instructions 1332 including the coded instructions of FIG. 6 may be stored in the mass storage device 1328, in the volatile memory 1314, in the non-volatile memory 1316, and/or on a removable tangible computer-readable storage medium such as a CD or DVD.

From the foregoing, it will be appreciated that example methods, apparatus and articles of manufacture have been disclosed that identify sources of network streaming services. From the foregoing, it will be appreciated that methods, apparatus and articles of manufacture have been disclosed which enhance the operations of a computer to improve the correctness of and possibility to identify the sources of network streaming services. In some examples, computer operations can be made more efficient, accurate and robust based on the above techniques for performing source identification of network streaming services. That is, through the use of these processes, computers can operate more efficiently by relatively quickly performing source identification of network streaming services. Furthermore, example methods, apparatus, and/or articles of manufacture disclosed herein identify and overcome inaccuracies and inability in the prior art to perform source identification of network streaming services.

Example methods, apparatus, and articles of manufacture to identify the sources of network streaming services are disclosed herein. Further examples and combinations thereof include at least the following.

Example 1 is a method including receiving a first audio signal that represents a decompressed second audio signal, identifying, from the first audio signal, a parameter of an audio compression configuration used to form the decompressed second audio signal, and identifying a source of the decompressed second audio signal based on the identified audio compression configuration.

Example 2 is the method of example 1, further including identifying a signal bandwidth of the first audio signal as the parameter of the audio compression configuration.

Example 3 is the method of example 2, wherein the parameter is a first parameter, and further including identifying, from the first audio signal, an audio coding format used to compress a third audio signal to form the decompressed second audio signal as a second parameter of the audio compression configuration, and identifying the source of the decompressed second audio signal based on the first parameter and the second parameter.

Example 4 is the method of example 1, further including identifying, from the first audio signal, an audio coding format used to compress a third audio signal to form the decompressed second audio signal as the parameter of the audio compression configuration.

Example 5 is an apparatus including a signal bandwidth identifier to identify a signal bandwidth of a received first audio signal representing a decompressed second audio signal, and a source identifier to identify a source of the decompressed second audio signal based on the identified signal bandwidth.

Example 6 is the apparatus of example 5, wherein the signal bandwidth identifier includes a transformer to form a frequency spectrum for a time interval of the received first audio signal, and a thresholder to identify an index representative of a cutoff frequency for the time interval.

Example 7 is the apparatus of example 5, wherein the signal bandwidth identifier includes a transformer to form a plurality of frequency spectrums for respective ones of a plurality of time intervals of the received first audio signal, a thresholder is to identify a plurality of indices representative of cutoff frequencies of respective ones of the plurality of time intervals, and a smoother to determine a median of the plurality of indices, the median representative of an overall cutoff frequency of the received first audio signal.

Example 8 is the apparatus of example 7, wherein the thresholder is to identify an index representative of a cutoff frequency by sequentially comparing values of a frequency spectrum starting with a highest frequency with a threshold until a value of the frequency spectrum exceeds the threshold.

Example 9 is the apparatus of example 5, further including an audio coding format identifier to identify, from the received first audio signal, an audio coding format used to compress a third audio signal to form the decompressed second audio signal, wherein the source identifier is to identify the source of the decompressed second audio signal based on the identified signal bandwidth and the identified audio coding format.

Example 10 is the apparatus of example 9, further including a time-frequency analyzer to perform a first time-frequency analysis of a first block of the received first audio signal according to a first trial audio coding format, and perform a second time-frequency analysis of the first block of the received first audio signal according to a second trial audio coding format, an artifact computer to determine a first compression artifact resulting from the first time-frequency analysis, and determine a second compression artifact resulting from the second time-frequency analysis, and a controller to select between the first trial audio coding format and the second trial audio coding format as the audio coding format based on the first compression artifact and the second compression artifact.

Example 11 is the apparatus of example 10, wherein the time-frequency analyzer performs a third time-frequency analysis of a second block of the received first audio signal according to the first trial audio coding format, and performs a fourth time-frequency analysis of the second block of the received first audio signal according to the second trial audio coding format, the artifact computer determines a third compression artifact resulting from the third time-frequency analysis, and determine a fourth compression artifact resulting from the fourth time-frequency analysis, and the controller selects between the first trial audio coding format and the second trial audio coding format as the audio coding format based on the first compression artifact, the second compression artifact, the third compression artifact, and the fourth compression artifact.

Example 12 is the apparatus of example 11, further including a post processor to combine the first compression artifact and the third compression artifact to form a first score, and combine the second compression artifact and the fourth compression artifact to form a second score, wherein the controller selects between the first trial audio coding format and the second trial audio coding format as the audio coding format by comparing the first score and the second score.

Example 13 is the apparatus of example 5, wherein the received first audio signal is recorded at a media presentation device.

Example 14 is a method including receiving a first audio signal that represents a decompressed second audio signal, identifying a signal bandwidth of the first audio signal, and identifying a source of the decompressed second audio signal based on the signal bandwidth.

Example 15 is the method of example 14, wherein identifying the signal bandwidth includes forming a plurality of frequency spectrums for respective ones of a plurality of time intervals of the first audio signal, identifying a plurality of indices representative of cutoff frequencies for respective ones of the plurality of time intervals, and determining a median of the plurality of indices, the median representative of an overall cutoff frequency of the first audio signal.

Example 16 is the method of example 15, wherein identifying the plurality of indices representative of cutoff frequencies for respective ones of the plurality of time intervals includes sequentially comparing values of a frequency spectrum starting with a highest frequency with a threshold until a value of the frequency spectrum exceeds the threshold is identified.

Example 17 is the method of example 14, further including identifying, from the first audio signal, an audio coding format used to compress a third audio signal to form the decompressed second audio signal, and identifying the source of the decompressed second audio signal based on the identified signal bandwidth and the identified audio coding format.

Example 18 is the method of example 17, wherein the identifying, from the first audio signal, the audio coding format includes performing a first time-frequency analysis of a first block of the first audio signal according to a first trial audio coding format, determining a first compression artifact resulting from the first time-frequency analysis, performing a second time-frequency analysis of the first block of the first audio signal according to a second trial audio coding format, determining a second compression artifact resulting from the second time-frequency analysis, and selecting between the first trial audio coding format and the second trial audio coding format as the audio coding format based on the first compression artifact and the second compression artifact.

Example 19 is the method of example 18, further including performing a third time-frequency analysis of a second block of the first audio signal according to the first trial audio coding format, determining a third compression artifact resulting from the third time-frequency analysis, performing a fourth time-frequency analysis of the second block of the first audio signal according to the second audio coding format, determining a fourth compression artifact resulting from the fourth time-frequency analysis, and selecting between the first trial audio coding format and the second trial audio coding format as the audio coding format based on the first compression artifact, the second compression artifact, the third compression artifact, and the fourth compression artifact.

Example 20 is the method of example 19, wherein selecting between the first trial audio coding format and the second trial audio coding format as the audio coding format based on the first compression artifact, the second compression artifact, the third compression artifact, and the fourth compression artifact includes combining the first compression artifact and the third compression artifact to form a first score, combining the second compression artifact and the fourth compression artifact to form a second score, and comparing the first score and the second score.

Example 21 is the method of example 14, wherein the audio coding format indicates at least one of an audio codec, a time-frequency transform, a window function, or a window length.

Example 22 is a non-transitory computer-readable storage medium comprising instructions that, when executed, cause a machine to at least receive a first audio signal that represents a decompressed second audio signal, identify a signal bandwidth of the first audio signal, and identify a source of the decompressed second audio signal based on the identified signal bandwidth.

Example 23 is the non-transitory computer-readable storage medium of example 22, including further instructions that, when executed, cause the machine to identify the signal bandwidth by forming a plurality of frequency spectrums for a plurality of time intervals of the first audio signal, identifying a plurality of indices representative of cutoff frequencies for respective ones of the plurality of time intervals, and determining a median of the plurality of indices, the median representative of an overall cutoff frequency of the first audio signal.

Example 24 is the non-transitory computer-readable storage medium of example 22, including further instructions that, when executed, cause the machine to identify, from the first audio signal, an audio coding format used to compress a third audio signal to form the decompressed second audio signal, and identifying the source of the decompressed second audio signal based on the identified signal bandwidth and the identified audio coding format.

Any references, including publications, patent applications, and patents, cited herein are hereby incorporated by reference to the same extent as if each reference were individually and specifically indicated to be incorporated by reference and were set forth in its entirety herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A tangible non-transitory computer-readable medium comprising instructions that, when executed, cause one or more processors to perform a set of operations comprising:

identifying a signal bandwidth of a received first audio signal that is obtained from a second audio signal by:

(i) identifying a plurality of indices representing cutoff frequencies of a plurality of time intervals of the received first audio signal; and (ii) determining a median of the plurality of indices, wherein the median represents an overall cutoff frequency of the received first audio signal, wherein the signal bandwidth is based on the median; and identifying a source of the second audio signal based on the identified signal bandwidth.

2. The tangible non-transitory computer-readable medium of claim 1, wherein the received first audio signal is obtained from the second audio signal by decompressing the second audio signal.

3. The tangible non-transitory computer-readable medium of claim 1, wherein identifying a signal bandwidth of a received first audio signal further comprises generating at least one frequency spectrum for the plurality of time intervals of the received first audio signal.

4. The tangible non-transitory computer-readable medium of claim 3, wherein identifying the plurality of indices representing cutoff frequencies comprises sequentially comparing values of the at least one frequency spectrum starting with a highest frequency with a threshold until a value of the at least one frequency spectrum exceeds the threshold.

5. The tangible non-transitory computer-readable medium of claim 1, wherein the set of operations further comprises identifying, from the received first audio signal, an audio coding format used to compress a third audio signal to form the second audio signal.

6. The tangible non-transitory computer-readable medium of claim 5, wherein identifying the source of the second audio signal is based on the identified signal bandwidth and the identified audio coding format.

7. The tangible non-transitory computer-readable medium of claim 1, wherein the set of operations further comprises performing a time-frequency analysis of the first audio signal and identifying, from the time-frequency analysis, a parameter of an audio compression configuration used to form the second audio signal.

8. The tangible non-transitory computer-readable medium of claim 7, wherein identifying the source of the second audio signal is based on the identified signal bandwidth and the identified parameter of the audio compression configuration.

9. A computer-implemented method comprising:

identifying a signal bandwidth of a received first audio signal that is obtained from a second audio signal by:

(i) identifying a plurality of indices representing cutoff frequencies of a plurality of time intervals of the received first audio signal; and (ii) determining a median of the plurality of indices, wherein the median represents an overall cutoff frequency of the received first audio signal, wherein the signal bandwidth is based on the median; and identifying a source of the second audio signal based on the identified signal bandwidth.

10. The computer-implemented method of claim 9, wherein the received first audio signal is obtained from the second audio signal by decompressing the second audio signal.

11. The computer-implemented method of claim 9, wherein identifying a signal bandwidth of a received first audio signal further comprises generating at least one frequency spectrum for the plurality of time intervals of the received first audio signal.

12. The computer-implemented method of claim 11, wherein identifying the plurality of indices representing cutoff frequencies comprises sequentially comparing values of the at least one frequency spectrum starting with a highest frequency with a threshold until a value of the at least one frequency spectrum exceeds the threshold.

13. The computer-implemented method of claim 9, wherein the computer-implemented method further comprises identifying, from the received first audio signal, an audio coding format used to compress a third audio signal to form the second audio signal.

14. The computer-implemented method of claim 13, wherein identifying the source of the second audio signal is based on the identified signal bandwidth and the identified audio coding format.

15. The computer-implemented method of claim 9, wherein the computer-implemented method further comprises performing a time-frequency analysis of the first audio signal and identifying, from the time-frequency analysis, a parameter of an audio compression configuration used to form the second audio signal.

16. The computer-implemented method of claim 15, wherein identifying the source of the second audio signal is based on the identified signal bandwidth and the identified parameter of the audio compression configuration.

17. A computing device comprising:

one or more processors; and a non-transitory, tangible computer-readable medium comprising instructions that, when executed, cause the one or more processors to perform a set of operations comprising:

identifying a signal bandwidth of a received first audio signal that is obtained from a second audio signal by:

(i) identifying a plurality of indices representing cutoff frequencies of a plurality of time intervals of the received first audio signal; and (ii) determining a median of the plurality of indices, wherein the median represents an overall cutoff frequency of the received first audio signal, wherein the signal bandwidth is based on the median; and identifying a source of the second audio signal based on the identified signal bandwidth.

18. The computing device of claim 17, wherein the received first audio signal is obtained from the second audio signal by decompressing the second audio signal.

19. The computing device of claim 17, wherein identifying a signal bandwidth of a received first audio signal further comprises generating at least one frequency spectrum for the plurality of time intervals of the received first audio signal.

20. The computing device of claim 17, wherein the set of operations further comprises performing a time-frequency analysis of the first audio signal and identifying, from the time-frequency analysis, a parameter of an audio compression configuration used to form the second audio signal.

* * * * *